US006468352B2

(12) United States Patent
Horiuchi et al.

(10) Patent No.: US 6,468,352 B2
(45) Date of Patent: Oct. 22, 2002

(54) METHOD AND APPARATUS FOR MODIFYING PARTICLES

(75) Inventors: Takahiro Horiuchi; Kiyofumi Morimoto, both of Yamatokoriyama (JP)

(73) Assignee: Sharp Kabushiki Kaisha, Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/196,954

(22) Filed: Nov. 20, 1998

(65) Prior Publication Data

US 2001/0050055 A1 Dec. 13, 2001

(30) Foreign Application Priority Data

Dec. 12, 1997 (JP) .............................................. 9-343446

(51) Int. Cl.[7] ............................................ C23C 16/448
(52) U.S. Cl. ........................ 118/716; 118/719; 118/715
(58) Field of Search .......................... 422/145; 118/716, 118/715, 719; 427/3; 204/164; 55/72; 156/616.2

(56) References Cited

U.S. PATENT DOCUMENTS

| 3,607,365 A | | 9/1971 | Lindlof ..................... 117/100 R |
| 3,991,225 A | * | 11/1976 | Blouin ............................ 427/3 |
| 4,314,525 A | * | 2/1982 | Hsu et al. .................... 118/716 |
| 4,340,399 A | * | 7/1982 | Luthra et al. .................. 55/72 |
| 4,656,056 A | | 4/1987 | Leuenberger ............... 427/213 |
| 4,818,495 A | * | 4/1989 | Iya .............................. 422/145 |
| 5,211,802 A | * | 5/1993 | Kaneko et al. .......... 156/616.2 |
| 5,254,231 A | * | 10/1993 | Heath et al. ................ 204/164 |
| 6,004,396 A | * | 12/1999 | Ishikawa .................... 118/715 |

FOREIGN PATENT DOCUMENTS

| DE | 35 16 966 A | 11/1985 |
| EP | 0 794 017 A | 9/1997 |
| EP | 0 794 017 A2 | 10/1997 |
| JP | 52002865 A | 10/1977 |
| JP | 02 122873 A | 5/1990 |
| JP | 7204545 A | 8/1995 |

OTHER PUBLICATIONS

Naito, et al., Concise explanation of the relevance with respect to "Fine Particle Engineering: Fundamentals and Applications of Distribution" (1994), pp. 123–136.

Naito, Concise explanation of the relevance with respect to "Today's Chemical Engineering–Fine Particle Engineering" (1993), pp. 6–25.

Kiyofumi Morimoto, et al., USSN 09/190,566, filed Nov. 12, 1998.

* cited by examiner

Primary Examiner—Gregory Mills
Assistant Examiner—Rudy Zervigon
(74) Attorney, Agent, or Firm—Dike, Bronstein, Roberts & Cushman/IP Group of Edwards & Angell; David G. Conlin

(57) ABSTRACT

Particles are cooled at a particle introducing section by a cooling device. A vapor of modifying agent for modifying the particles is produced by heating the modifying agent in a vapor producing chamber by a heating device. Further, a supersaturated vapor of the modifying agent is produced around the particles by mixing the cooled particles with the vapor of the modifying agent. The modifying agent condenses on the surface of the particles by the production of the supersaturated vapor, and consequently, a film of the modifying agent is formed on the surface of the particles. A thick film of the modifying agent can be formed if this film forming step is carried out repetitively. Thus, modified particles having formed thereon a thick uniform film of the modifying agent can be produced by quite a simple manipulation in a very short time.

19 Claims, 18 Drawing Sheets

METHOD AND APPARATUS FOR MODIFYING PARTICLES

FIELD OF THE INVENTION

The present invention relates to method and apparatus for modifying particles by forming a film of a modifying agent on the surface of particles, and more particularly, to method and apparatus for modifying particles by coating the particles with the modifying agent by letting the modifying agent condense on the surface of the particles under modifying agent's vaporous atmosphere.

BACKGROUND OF THE INVENTION

Besides a dry method, a method for modifying the surface of fine particles in a liquid phase has been known as a particle surface modifying method. Also, a kneading method, a stirring method using a medium, a spray dry method, etc. are widely adopted.

The above methods are well-known and described in detail in the references, such as:

1. "Fine Particle Engineering: Fundamentals and Applications of Distribution", First Edition, edited by Japan Fine Particle Engineering Technology Association, and published by Asakura Shoten, 1994, pp123–36; and 2. "Today's Chemical Engineering 45 Fine Particle Engineering", edited by Chemical Engineering Association, and published by Chemical Industry Association on Nov. 25, 1993, pp16–23.

Also, Japanese Laid-open Patent Application No. 204545/1995 (Tokukaihei No. 7-204545) discloses a method of forming a film on the surface of a subject. To be more specific, aerosol containing a solvent is sprayed in a chamber to let the aerosol particles collide with the surface of the subject while vaporizing the solvent from the surface of the subject, whereby a film made of solute of the particles is formed on the surface of the subject.

However, according to the above conventional particle modifying method, the particles are electrically charged and become hard to handle thereafter. Moreover, not only the modifying treatment takes too long, but also it demands a complex and expensive apparatus. Further, the above conventional modifying method can hardly modify fine particles, particularly, those in the order of nanometer.

Another method of modifying the particle surface is a method of exposing the particles to a liquid element's saturated or supersaturated atmosphere at room temperature under atmospheric pressure. For example, Japanese Laid-open Patent Application No. 2865/1977 (Tokukaisho No. 52-2865) discloses, as a technique for capturing aerosol particles, a method for growing aerosol particles up to a predetermined particle size by mixing high-temperature saturated air with low-temperature saturated air, each being a gas containing the aerosol particles, and then letting a water vapor condense on the surface of the aerosol particles. Likewise, an European Patent No. EP 0 794 017 A2 discloses a method for forming a film of a surface modifying agent on the surface of the particles by exposing the particles to a supersaturated atmosphere of the surface modifying agent, and then letting the surface modifying agent condense on the surface of the particles, thereby modifying the surface properties of the particles.

However, the above two methods are silent about an idea of letting a solid surface modifying agent condense on the surface of the particles at room temperature under atmospheric pressure, and the surface modifying agent must be vaporized in each method. Thus, materials which do not vaporize, such as resin (polymer), can not be used as the element for a vapor, and there arises a problem that available materials are limited.

SUMMARY OF THE INVENTION

The present invention is devised to solve the above problem, and therefore, has an object to provide method and apparatus for modifying particles which can produce modified particles coated with a thick uniform film of the modifying agent by a very simple manipulation in a short time.

The inventors of the present invention conducted a study to solve the above problem, and has already discovered a particle modifying method as described below, which is totally different from any of the conventional methods.

That is, the inventors of the present invention discovered a particle modifying method for forming a film of the modifying agent on the surface of the particles by the following steps of:

(1) producing a saturated vapor of the modifying agent in a treatment space in a condensing chamber;

(2) exposing the particles to the saturated vapor of the modifying agent by letting the same flow across the treatment space in the condensing chamber; and (3) turning the saturated vapor of the modifying agent into a supersaturated state by cooling the same in a delivery path connected to the treatment space in the condensing chamber to let the modifying agent condense and form a film on the surface of the particles.

The above method excels the conventional methods because it can modify the surface of the particles by a simple manipulation in a short time without electrically charging the particles. However, the above method needs improvement to form a satisfactory thick uniform film of the modifying agent on the surface of the particles.

Thus, the inventors of the present invention continued an assiduous study to improve the above method and apparatus for modifying the particles, and in due course, discovered following method and apparatus for modifying the particles.

To solve the above problem, a particle modifying method of the present invention has the steps of:

cooling particles to be surface-modified;

forming a vapor of a modifying agent for modifying the particles;

forming a film of the modifying agent on a surface of the particles by (1) producing a supersaturated vapor of the modifying agent around the particles by exposing the particles cooled in the cooling step to the vapor of the modifying agent to be mixed with each other, and (2) letting the modifying agent condense on the surface of the particles.

According to the above method, since the particles cooled in advance are exposed to the vapor of the modifying agent, a large temperature difference is made between the particles and vapor. Thus, a larger amount of the vapor of the modifying agent vapor-deposits on each particle, thereby making it possible to obtain the particles of a relatively large particle size.

Also, since all the particles are cooled to substantially the same temperature before they are introduced into a mixing section, the temperature does not vary much among the particles and is substantially the same. Thus, a substantially equal amount of the vapor of the modifying agent vapor-deposits on each particle, thereby making it possible to obtain the particles of a substantially uniform particle size.

Further, in case that the modifying agent is turned into a supersaturated state by cooling the walls of the mixing section, much of the modifying agent is lost as it deposits onto the wall surface. By contrast, in the present method, the loss of the modifying agent is very small because the supersaturated state is obtained by cooling the particles per se, thereby making it possible to let the modifying agent vapor-deposit on the surface of the particles efficiently. Moreover, in case that particles of a liquid are used, the evaporation of the particles per se when introduced into the saturated vapor of the modifying agent can be suppressed.

Further, since the above method employs a simple technique of cooling the vapor of the modifying agent to obtain the supersaturated atmosphere, it can offer another effect that both the modifying treatment manipulation and apparatus can be simpler.

Furthermore, the above method can form a film of the modifying agent on the surface of the particles without any step such that electrically charges the particles, for example, the stirring of the particles. Thus, the particles after the modifying treatment, namely, the modified particles, are not electrically charged by the modifying treatment, and therefore, easy-to-handle modified particles can be obtained. Also, compared with the stirring of the particles in the conventional particle modifying treatment, the cooling of the particles and the subsequent mixing with the vapor of the modifying agent takes a very short time.

According to the above method, a film of the modifying agent is formed on the surface of the particles by exposing the particles to the supersaturated vapor of the modifying agent and then letting the modifying agent condense on the surface of the particles. Thus, unlike the conventional mixing method or spray dry method, a complex and expensive apparatus can be omitted. Also, the conventional methods have a drawback that the particles are electrically charged, but the above method can modify the particles without electrically charging the particles. Moreover, if a modifying agent having a high degree of supersaturation is selected, a desired amount of the vapor of the modifying agent can be let condense on the surface of the particles without repeating the modifying treatment.

In addition, since the above method uses a simple physical phenomenon, in which a supersaturated atmosphere of the modifying agent is produced and the particles are exposed to the supersaturated atmosphere to let the modifying agent condense on the surface of the particles, the manipulation can be simple and easy and the apparatus for implementing the above method can be simple and inexpensive. Also, surface tension exerts on the film of the modifying agent immediately after it is formed on the surface of the particles. Thus, the particles are coated with a film of the modifying agent having a uniform thickness.

Incidentally, if a modifying agent having a high degree of supersaturation is used, a film of the modifying agent of a desired thickness or modified particles of a desired particle size can be obtained by effecting the particle modifying treatment only once. However, this may not be the case if a modifying agent having a low degree of supersaturation is used.

Thus, in the above particle modifying method, it is preferable to form a thicker film of the modifying agent on the surface of the particles by repeating the film forming step more than once.

According to the above method, since the modifying treatment for forming a film of the modifying agent can be effected repetitively to the same particles, even when a modifying agent having a low degree of supersaturation is used, it becomes possible to grow the particles up to a satisfactory particle size by repeating the modifying treatment as many times as needed. Consequently, the modified particles of a desired particle size coated with a film of the modifying agent of a desired thickness can be obtained, thereby eliminating the above problem.

Also, to solve the above problem, a particle modifying apparatus of the present invention is furnished with:
   a mixing section for mixing cooled particles with a vapor of a modifying agent for modifying the particles to let the modifying agent condense on the surface of the particles;
   a particle introducing section for introducing the particles into the mixing section;
   a cooling device for cooling the particles introduced into the particle introducing section; and
   a modifying agent vapor supplying section for supplying the vapor of the modifying agent to the mixing section.

According to the above arrangement, the cooled particles are supplied to a space in the mixing section by the particle introducing section, and the vapor of the modifying agent is supplied to the same by the modifying agent vapor supplying section. Later, the particles and the vapor of the modifying agent are mixed with each other in the mixing section, whereby a supersaturated vapor of the modifying agent is produced around the particles. Consequently, the modified particles having thereon the condensed modifying agent can be obtained.

If the particles are cooled beforehand as described above, the modifying agent can condense around the particles more easily, so that it can form a uniform film on the surface of the particles. Also, in case that particles of a liquid are used, the evaporation of the particles per se when introduced into the saturated vapor of the modifying agent can be suppressed.

Moreover, since the cooled particles are exposed to the vapor of the modifying agent, compared with a case where the particles are introduced without being cooled, there is a larger temperature difference between the particles and vapor of the modifying agent. Thus, a larger amount of the modifying agent vapor-deposits on each particle, and as a consequence, the particles of a larger particle size can be obtained.

Further, since the particles are cooled to substantially the same temperature before they are introduced into the mixing section, the temperature does not vary much among the particles, and is substantially the same. Thus, a substantially equal amount of the modifying agent vapor-deposits on each particle, thereby making it possible to obtain the particles of a substantially uniform particle size.

Furthermore, in case that the modifying agent is turned into a supersaturated state by cooling the mixing section, a loss of the modifying agent is large because much of the vapor of the modifying agent deposits onto the wall surface. By contrast, since the supersaturated state is obtained by cooling the particles per se in the present method, an amount of the vapor of the modifying agent deposited onto the wall surface is very small and so is a loss of the modifying agent, thereby making it possible to let the modifying agent vapor-deposit on the surface of the particles efficiently. Consequently, large particles having a particle size of 5 $\mu$m or greater can be obtained. Note that, according to the above arrangement, the modifying treatment can be effected repetitively in succession to the same particles successively introduced into the mixing section from the particle introducing section.

To solve the above problem, another particle modifying apparatus of the present invention is furnished with:

a mixing section for mixing particles with a vapor of a modifying agent for modifying the particles;

a vapor producing chamber for producing the vapor of the modifying agent inside thereof;

a vapor outlet, provided at an end portion of the vapor generating section, for introducing the vapor of the modifying agent in the vapor producing chamber to the mixing section;

a particle inlet, provided to the vapor producing chamber at an end portion on a side of the vapor outlet, for introducing the particles into the vapor producing chamber; and a cooling device for cooling a mixture of the particles and the vapor of the modifying agent in the mixing section to let the modifying agent condense on the surface of the particles.

According to the above arrangement, since the particle inlet is provided to the vapor producing chamber at an end portion on the side of the vapor outlet, the particles can be transported to the mixing section swiftly without being deteriorated by the heat inside the vapor producing chamber. Also, according to the above arrangement, it has become possible to minimize the vapor-deposition onto the particle introducing section, and hence a drop in concentration of the saturated vapor of the modifying agent filling and flowing in the vapor producing chamber, while at the same time minimizing the temperature interference between the high-temperature interior of the vapor producing chamber and the low-temperature particle introducing section.

For a fuller understanding of the nature and advantages of the invention, reference should be made to the ensuing detailed description taken in conjunction with the accompanying drawings.

DESCRIPTION OF THE EMBODIMENTS

Embodiment 1

Figure 1:
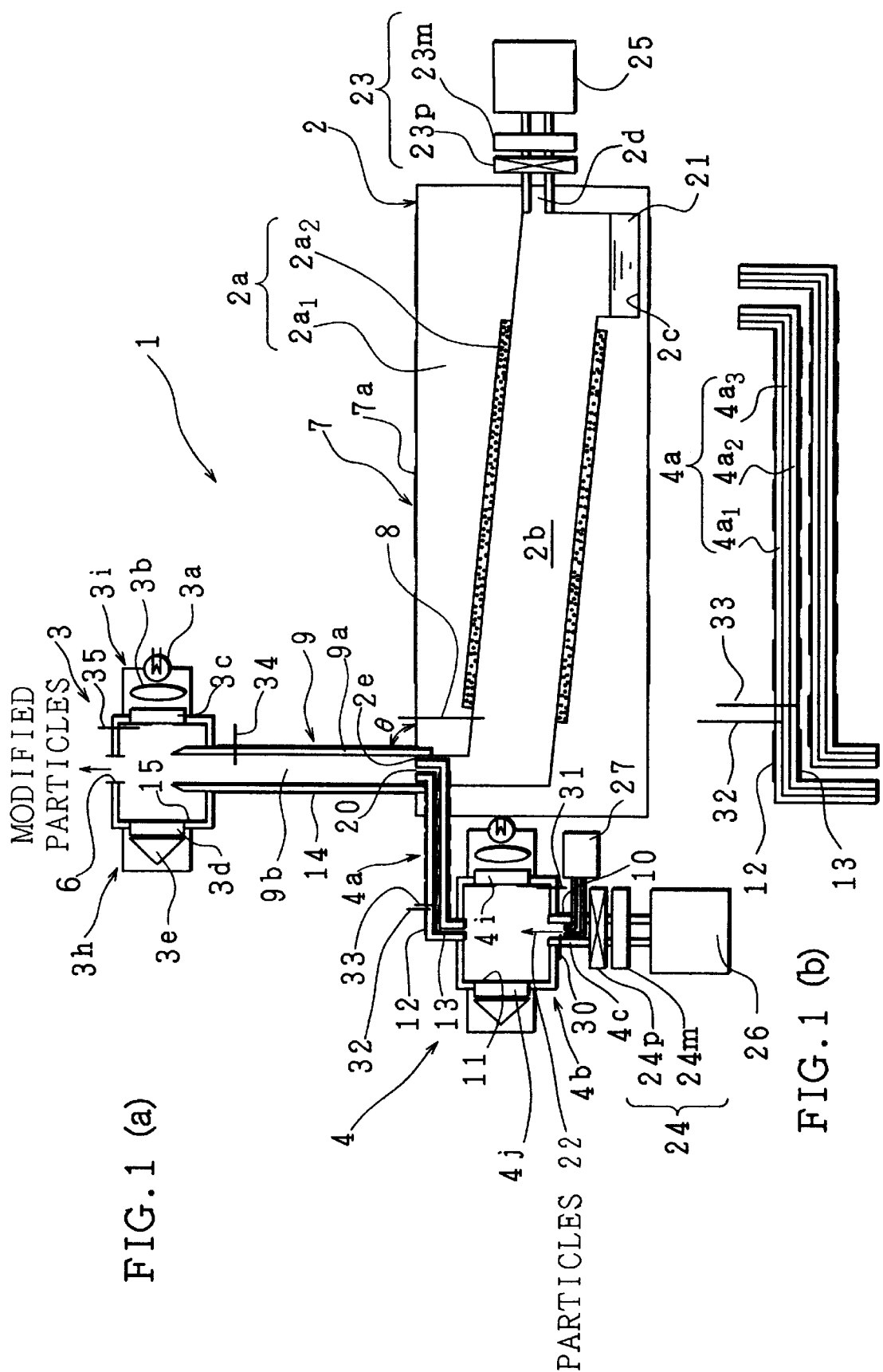
FIG. 1(a) is a vertical cross section showing an entire particle modifying apparatus in accordance with an example embodiment of the present invention.
FIG. 1(b) is a vertical cross section showing a particle introducing pipe of the particle modifying apparatus.

Referring to the accompanying drawings, the following description will describe an example embodiment of the present invention.

As shown in FIG. 1(a), a particle modifying apparatus 1 used for implementing a particle modifying method in accordance with the present embodiment comprises a vapor producing chamber (modifying agent vapor supplying section) 2 capable of withholding a modifying agent 21 inside, a particle introducing section 4 for introducing cooled particles 22 to a mixing section 9, a heating device (modifying agent vapor supplying section, heating means) 7 for heating the modifying agent 21 to produce a saturated vapor of the same in the vapor producing chamber 2, the mixing section 9 for letting the modifying agent 21 condense on the surface of the particles 22 by mixing the cooled particles 22 with the saturated vapor of the modifying agent 21, cooling devices (particle cooling means) 10 and 13 for cooling the particles 22, a temperature adjusting device (temperature adjusting means) 14 for adjusting a temperature of the mixing section 9, etc.

The vapor producing chamber 2 is an elongate slim cylinder or prism extending in a horizontal direction. The shape of the vapor producing chamber 2 is not especially limited, but a horizontally long shape is more preferable than a vertically long shape for the suitable use in the particle surface treatment. The vapor producing chamber 2 includes a wall section 2a, inside of which a space 2b extending along the longitudinal direction of the vapor producing chamber 2 is formed. The space 2b is cylindrical and tilted vertically with respect to a central axis direction of the vapor producing chamber 2. A reservoir section 2c for preserving the modifying agent 21 is formed at the lower end portion of the space 2b. The tilt of the space 2b allows the modifying agent 21 vapor-deposited onto the inner wall surface of the space 2b to flow back into the reservoir section 2c.

A clean gas inlet 2d communicating with a space above the reservoir 2c is formed at an end portion of the vapor producing chamber 2 on the reservoir 2c side. On the opposing side to the clean gas inlet 2d, a vapor outlet 2e, which opens upward from the space 2b, is formed to release the saturated vapor of the modifying agent 21 produced in the space 2b to the mixing section 9 along a direction perpendicular to the longitudinal direction (that is, vertical direction) of the vapor producing chamber 2. The vapor outlet 2e opens toward the center of a treatment space 9b in the mixing section 9, so that the saturated vapor of the modifying agent 21 in the space 2b is introduced smoothly into the mixing section 9.

In the particle modifying apparatus 1, the saturated vapor of the modifying agent 21 is sent to the mixing section 9 by introducing a modifying agent transport gas to the space 2b from a clean gas supplying device (modifying agent transport gas supplying section) 25 through the clean gas inlet 2d. Here, preferred as the modifying agent transport gas is an inert gas which is inactive to the particles 22 and modifying agent 21 and remains in the gaseous state at a temperature inside the vapor producing chamber 2.

If the modifying agent transport gas introduced into the space 2b contains fine impure particles as floating particles, these impure particles form nuclei for the condensation of the saturated vapor of the modifying agent 21 when the saturated vapor is mixed with the cooled particles 22, and turned into a supersaturated state. This is the reason why the particle modifying apparatus 1 includes the clean gas supplying device 25 for supplying a clean modifying agent transport gas free of the impure particles and vapor to the space 2b in the vapor producing chamber 2. Consequently, it has become possible to prevent the impure particles from forming the nuclei for the condensation of the saturated vapor of the modifying agent 21. Also, in case that the modifying agent transport gas contains an impure vapor, when the saturated vapor of the modifying agent 21 condenses on the surface of the particles 22, the impure vapor condenses as well with the saturated vapor, thereby lowering the purity of the film of the modifying agent 21 formed on the surface of the particles 22. However, the present particle modifying apparatus 1 can prevent such an inconvenience.

The clean gas supplying device 25 is connected to the vapor producing chamber 2 through an impurity removing device (a first impurity removing device) 23 for removing the impurities contained in the modifying agent transport gas. Thus, even when less pure commercially available gas or air is used as the modifying agent transport gas, not only the nucleation of the floating fine impure particles for the condensation of the modifying agent 21, but also the condensation of the impure vapor contained in the particle transport gas on the particles 22 can be prevented. The first impurity removing device 23 comprises an air filter device 23p and a mist removing device 23m herein, but either can be omitted when occasion demands.

The wall section 2a of the vapor generating case 2 comprises an outside wall section $2a_1$ which does not transmit a gas, and an inner wall section $2a_2$. The material of the inner wall section $2a_2$ is not especially limited, but as shown in FIG. 1(a), a porous material, such as ceramics and felt, is preferable, so that the modifying agent 21 is impregnated therein. This arrangement allows the modifying agent 21 of any kind to evaporate efficiently. In FIG. 1(a), the inner wall section $2a_2$ made of a porous material is provided entirely on the inner surface of the outer wall section $2a_1$.

However, the arrangement is not limited to this disclosure, and the inner wall section $2a_2$ may be provided partially on the inner surface of the outer wall section $2a_1$ when occasion demands. When at least a part of the member facing the space 2b in the vapor producing chamber 2 is made of a porous material, the modifying agent 21 is exposed to a heated atmosphere in the vapor producing chamber 2 while being impregnated into the porous material having a large surface area. Consequently, the saturated vapor of the modifying agent 21 can be obtained efficiently in a short time.

The heating device 7 is provided to heat the inner wall section $2a_2$ and the interior of the space 2b in the vapor producing chamber 2. The heating device 7 comprises a heater 7a and an unillustrated variable autotransformer generally known as Variac. The heater 7a is provided on the outward surface of the outer wall section $2a_1$ in the vapor producing chamber 2, and as shown in FIG. 1(a), it is, for example, a ribbon heater wound around the outward surface of the wall section 2a of the vapor producing chamber 2 in spiral. A thermometer 8 is provided to the wall section 2a of the vapor producing chamber 2 to measure temperatures of the inner wall section $2a_2$ and space 2b.

The particle introducing section 4 is connected to a particle inlet 20 provided near the vapor outlet 2e at the end portion on the releasing side of the vapor producing chamber 2. Consequently, it has become possible to minimize the vapor-deposition onto the particle introducing section 4, and hence a drop in concentration of the saturated vapor of the modifying agent 21 filling and flowing in the vapor producing chamber 2, while at the same time minimizing the temperature interference between the high-temperature interior of the vapor producing chamber 2 and the low-temperature particle introducing section 4. Note that, the particle inlet 20 opens toward the center of the treatment space 9b provided in the mixing section 9, so that the particles 22 are introduced smoothly into the mixing section 9 from the particle introducing section 4.

The particle introducing section 4 is supplied with (1) the particle transport gas which transports the particles 22 to the particle introducing section 4 from the clean gas supplying device 26 at a certain flowing rate, and (2) the particles 22 supplied from the particle supplying device 27 also at a certain flowing rate. The particles 22 and particle transport gas are supplied to the particle introducing section 4 by means of a compressor or the like. An inert gas, which is inactive to the particles 22 and modifying agent 21 and remains in the gaseous state at a temperature inside the particle introducing section 4, is suitably used as the particle transport gas.

The particles 22 supplied to the particle introducing section 4 are transported through the particle introducing section 4 while being kept afloat in the particle transport gas, and cooled by means of the cooling devices 10 and 13 before they reach the particle inlet 20. Consequently, the particles 22 are protected from deterioration (including liquidation and evaporation), deformation, transformation, etc. caused by the heat during the transportation step through the particle introducing section 4 before they are mixed with the saturated vapor of the modifying agent 21 in the mixing section 9. At the same time, a supersaturated vaporous atmosphere can be formed around the particles 22 by merely mixing the cooled particles 22 with the saturated vapor of the modifying agent 21 in the mixing section 9.

If the particle transport gas contains fine impure particles as the floating particles while the particles 22 are cooled by the cooling devices 10 and 13 in the particle introducing section 4, the impure particles form nuclei for the condensation of the saturated vapor of the modifying agent 21 when the saturated vapor of the modifying agent 21 is mixed with the cooled particles 22 in the mixing section 9. For this reason, the particle modifying apparatus 1 is arranged to introduce a clean gas which is free of impure particles and vapor as the particle transport gas. Consequently, the nucleation of the impure particles for the condensation of the saturated vapor of the modifying agent 21 can be prevented. Also, in case that the particle transport gas contains an impure vapor, when the saturated vapor of the modifying agent 21 condenses on the surface of the particles 22, the impure vapor condenses as well with the saturated vapor of the modifying agent 21, thereby lowering the purity of the film of the modifying agent 21 formed on the surface of the particles 22. However, the present particle modifying apparatus 1 can prevent such an inconvenience.

To introduce a clean gas which is free of impure particles and vapor to the particle introducing section 4 as the particle transport gas, the particle modifying apparatus 1 includes an impurity removing device (a second impurity removing device) 24 for removing impure particles and vapor contained in the particle transport gas somewhere between the clean gas supplying device 26 and particle introducing section 4. Thus, even when less pure commercially available gas or air is used as the particle transport gas, not only the nucleation of the floating fine impure particles for the condensation of the modifying agent 21, but also the condensation of the impure vapor contained in the particle transport gas on the surface of the particles 22 can be prevented. The second impurity removing device 24 comprises an air filter device 24$p$ and a mist removing device 24$m$ herein, but either component can be omitted when occasion demands.

As shown in FIG. 1($a$), the particle introducing section 4 includes a particle introducing pipe 4$a$ fitted into the end portion of the vapor outlet 2 of the vapor producing chamber 2 to be connected to the particle introducing inlet 20. As shown in FIG. 1($b$), the particle introducing pipe 4$a$ is of a triple-layer structure composed of an outer wall section 4$a_1$, an inner wall section 4$a_2$, and a heat insulator layer 4$a_3$ inserted between the above two wall sections 4$a_1$ and 4$a_2$. When the heat insulator layer 4$a_3$ is inserted between the outer wall section 4$a_1$ and inner wall section 4$a_2$ in this manner, not only the heating to a space in the particle introducing pipe 4$a$ by the saturated vapor of the modifying agent 21, but also the condensation of the saturated vapor of the modifying agent 21 on the outer wall'section 4$a_1$ can be prevented. Also, the temperature of the outer wall section 4$a_1$ and inner wall section 4$a_2$ can be controlled accurately in a short time. It is preferable that the particle introducing pipe 4$a$ is of the triple-layer structure as is in the present embodiment, but the arrangement is not limited to the above disclosure.

The cooling device 13 is provided to the inner wall section 4$a_2$ of the particle introducing pipe 4$a$ to cool the particles 22 and particle transport gas, before they reach the particle inlet 20 in the particle introducing section 4, to a temperature at which a supersaturated vapor of the modifying agent 21 is produced around the particles 22 when the particles 22 and the saturated vapor of the modifying agent 21 are mixed with each other. Consequently, a supersaturated atmosphere of the modifying agent 21 can be produced around the particles 22 by merely mixing the cooled particles 22 with the saturated vapor of the modifying agent 21 in the mixing section 9.

A thermometer 33 is also provided to the inner wall section 4$a_2$ of the particle introducing pipe 4$a$ to measure temperatures of the particles 22 and particle transport gas before they reach the particle inlet 20 in the particle introducing section 4. Based on the temperatures detected by the thermometer 33, the cooling device 13 controls temperatures of the particles 22 and particle transport gas to stay below a temperature at or above which at least the particles 22 are deteriorated, deformed, transformed, etc. Consequently, the particles 22 can be protected from the deterioration, deformation, transformation, etc. caused by the heat from the saturated vapor of the modifying agent 21 during the transportation step through the particle introducing section 4 before they are mixed with the saturated vapor of the modifying agent 21 in the mixing section 9.

The cooling device 13 is composed of, for example, a Peltier element which cools a subject through the Peltier effect. Alternatively, a device which cools a subject using liquid nitrogen, water, or an organic solvent cooled by a refrigerant like dry ice, or a Liebig condenser is also available as the cooling device 13 depending on a desired temperature.

A thermometer 32 for measuring a temperature of the outer wall section $\mathbf{4}a_1$, and a heating device (outer surface heating means) 12 for heating the outer wall section $\mathbf{4}a_1$ are provided to the outer wall section $\mathbf{4}a_1$ of the particle introducing pipe **4*a*. Based on the temperature detected by the thermometer 32, the heating device 12 controls a temperature of the outer wall section $\mathbf{4}a_1$ to stay above a temperature of the space 2*b* in the vapor producing chamber 2, that is, a temperature of the saturated vapor of the modifying agent 21. Consequently, the modifying agent 21 which has been turned into a saturated vapor in the vapor producing chamber 2 is not cooled by the outer wall section $\mathbf{4}a_1$, and therefore, the condensation of the modifying agent 21** on the surface of the outer wall section $\mathbf{4}a_1$ can be prevented.

It is preferable that the thermometers 32 and 33, heating device 12, and the cooling device 13 are provided to the particle introducing pipe **4*a* as are in the present embodiment, but the arrangement is not limited to the above disclosure. However, at least a part of the member facing a passage of the particles 22 in the particle introducing section 4** must be cooled.

To prevent the heating by the saturated vapor of the modifying agent 21, it is preferable to cut a portion of the particle introducing pipe **4*a* protruding inside the space 2*b* in the vapor producing chamber 2 to the least length. Further, it is preferable that the particle introducing pipe 4*a* is provided along a direction perpendicular to a direction in which the saturated vapor flows at the vapor outlet 2*e* of the vapor producing chamber 2. However, the particle introducing pipe 4*a* can be provided in any other adequate manner, for example, in such a manner to stand on the bottom portion of the vapor producing chamber 2 at an angle substantially parallel to the direction in which the vapor flows at the vapor outlet 2*e***.

An optical detecting device (optical detecting means) **4*b* is connected to the other end of the particle introducing pipe 4*a* opposite to the end of the particle inlet 20 for optically detecting a particle size and concentration of the particles of the particles 22 supplied from the particle supplying device 27 before the modifying treatment is effected. Consequently, it has become possible to control a size of the particles 22 by swiftly reflecting the detection result of the particle size and concentration of the particles. The optical detecting device 4*b*** may detect either the particle size or concentration of the particles.

The optical detecting device **4*b* and an optical detecting device 3** described below are of the same structure, and the former includes two transparent plates 4*i* and 4*j* while the latter includes two transparent plates 3*d* and 3*d*. The transparent plates 4*i* and 4*j* are provided with a thermometer 31 for measuring temperatures of the transparent plates 4*i* and 4*j*, and a heating device 11 for heating the transparent plates 4*i* and 4*j*.

Based on the temperatures measured by the thermometer 31, the heating device 11 controls the temperatures of the transparent plates 4*i* and 4*j* to stay above a temperature at or below which a slight amount of the impure vapor contained in the particle transport gas condenses. When arranged in this manner, a slight amount of the impure vapor contained in the particle transport gas is not cooled in the particle introducing section 4, and therefore, does not condense on the transparent plates 4*i* and 4*j*. Thus, the optical detecting device 4*b* can detect the particle size or concentration of the particles easily. The thermometer 31 and heating device 11 may be arranged to measure and control the temperature of the inner surface of the optical detecting device 4*b* or a space in the optical detecting device 4*b*.

The optical detecting device 4*b* is connected to the second impurity removing device 24 and particle supplying device 27 through a connection pipe 4*c*. A cooling device 10 for cooling the inner surface of the connection pipe 4*c* and a thermometer 30 for measuring a temperature of the inner surface of the connection pipe 4*c* are provided to the inner surface of the connection pipe 4*c*.

Based on the temperature measured by the thermometer 30, the cooling device 10 cools the inner surface of the connection pipe 4*c* to a temperature at which a supersaturated atmosphere of the modifying agent is produced around the particles 22 when the particles 22 are mixed with the saturated vapor of the modifying agent 21. The cooling device also controls a temperature of the inner surface of the connection pipe 4*c* to stay below a temperature at or above which the particles 22 are deteriorated, deformed, transformed, etc. Thus, the particles 22 can be protected from the deterioration, deformation, transformation, etc. caused by the heat during the transportation step between the second impurity removing device 24 and optical detecting device 4*b* before they are mixed with the saturated vapor of the modifying agent 21 in the mixing section 9.

The mixing section 9 is connected to the vapor outlet 2*e* of the vapor producing chamber 2 and has a linearly extending pipe shape. The mixing section 9 is tilted at an angle θ ranging from 1 to 179 degrees with respect to the top surface (horizontal surface) of the vapor producing chamber 2. It is preferable to set the tilting angle θ with respect to the horizontal surface to substantially 90 degrees, more specifically, to a range between 80 and 100 degrees.

When the tilting angle θ of the mixing section 9 with respect to the horizontal surface is in the above specified range, even if the vapor of the modifying agent 21, albeit in a very small amount, undergoes self-condensation on the inner surface of the mixing section 9 when the vapor is mixed with the cooled particles 22 and turned into the supersaturated state from the saturated state, the condensed modifying agent 21 in the liquid state on the inner surface drops by gravity and returns to the vapor producing chamber 2. Thus, the returned modifying agent 21 can be heated again in the vapor producing chamber 2 and recycled as the saturated vapor. Consequently, since a used amount of the modifying agent 21 can be reduced, not only the manufacturing cost of the modified particles 22 (hereinafter, referred to as modified particles), but also the disposal cost of the modifying agent 21 can be saved. Also, when the angle θ is in the above-specified range, the modified particles can be readily released from the mixing section 9 along with the flow of the saturated vapor heated in the vapor producing chamber 2.

The mixing section 9 includes a treatment space 9*b* in the pipe wall section 9*a*, and as temperature adjusting means, a temperature adjusting device 14 is provided on the outer circumference surface of the mixing section 9 to adjust a temperature of the treatment space 9*b*. The mixing section 9 also includes a thermometer 34 for detecting a temperature of the treatment space 9*b*. Based on the temperature detected by the thermometer 34 and a control signal sent from a control device (described below), the adjusting device 14 adjusts a temperature T4 of the treatment space 9*b* in the mixing section 9 to satisfy the following inequality, T2>T4>T3>T1, T2>T3>T4>T1, or T2>T3>T1>T4, where T1 is a temperature of the cooled particles measured by the thermometer 33, T2 is a temperature of the saturated vapor of the modifying agent 21 measured by the thermometer 8, and T3 is a temperature of a mixed gas obtained by mixing the particles 22 and the saturated vapor of the modifying agent 21.

When the temperature adjusting device 14 adjusts the temperature T4 of the treatment space 9*b* in the mixing section 9 to stay above the temperature T3 of the mixed gas in the above manner, the saturated vapor of the modifying agent 21 in the treatment space 9*b* does not condense on the inner surface of the pipe wall section 9*a* of the mixing section 9. Also, a loss of the modifying agent 21 by the deposit on the pipe wall section 9*a* of the mixing section 9 can be reduced, thereby realizing efficient use of the materials. Consequently, not only an efficient condensation phenomenon can take place, but also a loss of the modifying agent 21 can be reduced.

Further, when the temperature adjusting device 14 adjusts the temperature T4 of the treatment space 9*b* in the mixing section 9 to stay below the temperature T2 of the saturated vapor of the modifying agent 21, a supersaturated vapor of the modifying agent can be produced in the treatment space 9*b* in the mixing section 9 in a secure manner. When the temperature adjusting device 14 is controlled in such a manner that the temperature T4 of the treatment space 9*b* in the mixing section 9 to satisfy the following inequality, T2>T3>T4>T1 or T2>T3>T1>T4, a degree of supersaturation of the modifying agent 21 can be raised, thereby making it possible to obtain lager particles. For example, a device which can control the temperatures in a range between 240K and 370K can be used as the temperature adjusting device 14.

The top end portion of the mixing section 9 is connected to a particle outlet 6 through which the modified particles are released to the outside of the particle modifying apparatus 1. Also, a transportation path in the mixing section 9 reaches a space between a light irradiating section 3*i* and a light receiving section 3*j* in the optical detecting device 3.

The optical detecting device 3 optically detects the particle size and concentration of particles of the modified particles. The optical detecting device 3 is provided at the top end portion of the mixing section 9, and includes the light irradiating section 3*i* and light receiving section 3*j* which oppose each other. The light irradiating section 3*i* includes a light source 3*a*, a lens 3*b*, and a transparent plate 3*c*. The light receiving section 3*j* includes a transparent plate 3*d* and a photodetector 3*e*. The optical detecting device 3 may detect either the particle size or concentration of particles.

The optical detecting device 3 is well known, and it detects the particle size and concentration of particles through light transmitting/scattering method. The detecting principle of the particle size and concentration of the particles by the light transmitting/scattering method is widely known, and for example, described in detail in "Particle Measurement Technique", edited by Particle Engineering Association and published by Nikkan Kogyo Shimbun Ltd. The above publication describes, as other general methods of detecting the particle size and concentration of particles, the X-ray transmitting method, precipitation method, laser diffracting/scattering method, photon correlation method using the dynamic scattering method, X-ray transmitting method using the dynamic scattering method, etc. In the present invention, besides the method using the optical detecting device 3, the image analyzing method using an optical microscope or an electronic microscope and so forth can be used as the method of detecting the particle size and concentration of particles.

Providing the optical detecting device 3 in the particle modifying apparatus 1 makes it possible to control the particle size and concentration of particles swiftly by reflecting the detection result of the particle size and concentration of particles. Consequently, the following effects can be attained:

1) A film-thickness of the modifying agent 21 formed on the surface of the particles 22 can be controlled. The film thickness varies depending on temperatures of the particles 22, vapor of the modifying agent 21, and mixing section 9, a ratio of flowing amounts of the particles 22 and the vapor of the modifying agent 21, and the concentration of particles. The film becomes thinner as the concentration of particles rises higher. Thus, the film thickness can be controlled by adjusting the concentration of particles and/or temperatures. Also, since the optical detecting device 3 detects the particle size, that is, the size of the particles 22, the film thickness can be controlled accurately.

2) The productivity of the modified particles can be adjusted. The productivity varies depending on the concentration of particles, and it improves as the concentration of particles rises higher. Thus, the productivity can be controlled by adjusting the concentration of particles beforehand in response to the concentration of particles detected by the optical detecting device 3.

3) Better reproducibility of the modified particles can be attained. To be more specific, to adjust the particle size and concentration of particles detected by the optical detecting device 3 to those detected in the previous treatment, the properties of the modified particles of the preceding treatment can be reproduced.

4) A self-condensation phenomenon of the modifying agent 21 can be detected and prevented by comparing the concentration of particles of the modified particles with the concentration of particles of the particles 22.

The transparent plates 3c and 3d of the optical detecting device 3 include a thermometer 35 for measuring temperatures of the transparent plates 3c and 3d, and a heating device 15 for heating the transparent plates 3c and 3d to keep the same above a temperature at or below which the modifying agent 21 condenses. Thus, based on the temperatures detected by the thermometer 35, the heating device 15 adjusts the temperatures of the transparent plates 3c and 3d to stay above a temperature at or below which the modifying agent 21 condenses. When arranged in this manner, the modifying agent 21, which has been turned into the saturated vapor in the vapor producing chamber 2, is not cooled in the mixing section 9, and therefore, does not condense on the transparent plates 3c and 3d. Thus, the optical detecting device 3 can detect the particle size or concentration of the particles easily.

The thermometer 35 and heating device 15 may be arranged to measure a temperature of the inner surface of or a space in the optical detecting device 3.

Figure 2:
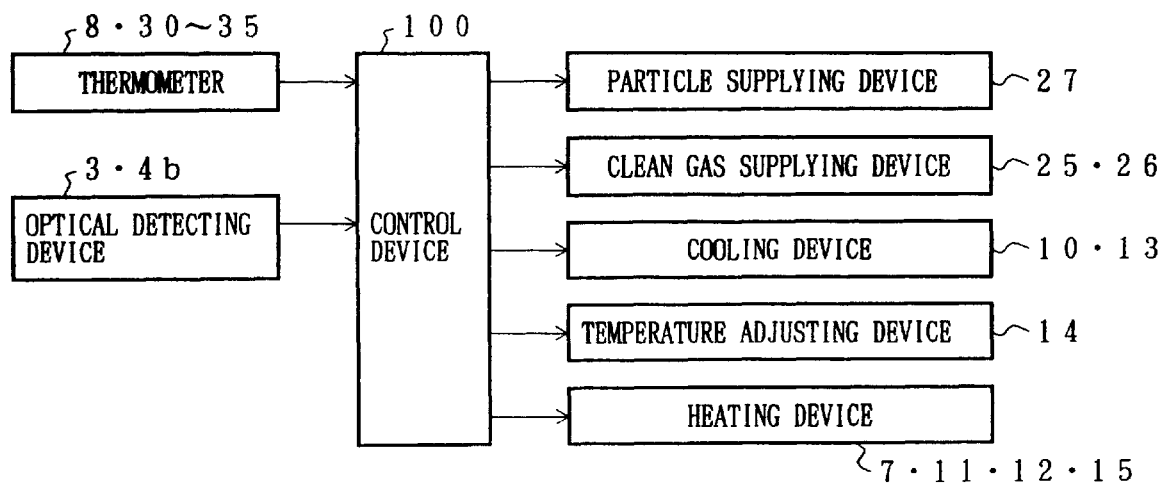
FIG. 2 is a block diagram depicting a control section and members connected to the control section of the particle modifying apparatus of FIG. 1(a)

Although it is not illustrated in FIGS. 1(a) and 1(b), as shown in. FIG. 2, the present particle modifying apparatus 1 includes a control device 100 for automatically carrying out a series of jobs for the modifying treatment. The control device 100 receives temperature values detected by the thermometers 8 and 30–35, and values of the particle size and concentration of particles measured by the optical detecting devices 3 and 4b. Also, based on these input values, the control device 100 outputs control signals to the particle supplying device 27, clean gas supplying devices 25 and 26, cooling devices 10 and 13, temperature adjusting device 14, and heating devices 7, 11, 12, and 15.

The control device 100 controls (1) the particle supplying device 27 and clean gas supplying device 26 in such a manner that the cooled particles 22 are supplied to the mixing section 9 together with a clean gas (particle transport gas); (2) the heating device 7 in such a manner that the modifying agent 21 in the vapor producing chamber 2 is turned into the saturated vapor; (3) the clean gas supplying device 25 in such a manner that the saturated vapor of the modifying, agent 21 in the vapor producing chamber 2 is transported to the mixing section 9; (4) the cooling devices 10 and 13 and temperature adjusting device 14 in such a manner that the modifying agent 21 is turned into the supersaturated state by the cooled particles 22 in the mixing section 9; and (5) the particle outlet 6 in such a manner to release the modified particles through the same.

Figure 4:
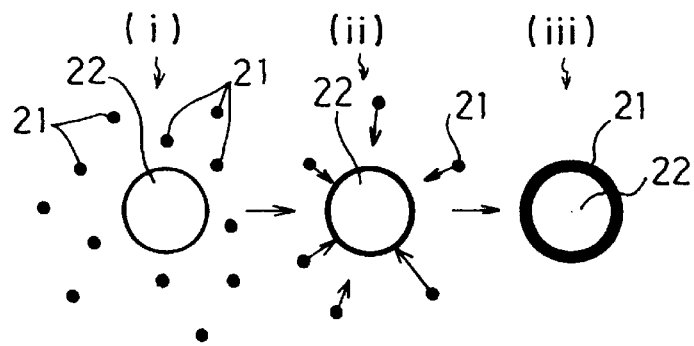
FIG. 4 is a view explaining steps of a particle modifying process by the modifying method of FIG. 3.

As shown in FIG. 4, the particle modifying apparatus 1 effects the treatment for forming a film of the modified agent 21 on the surface of the particles 22, that is, modifying treatment.

Materials which remain in a liquid state at room temperature, or remain solid state at room temperature and turn into a liquid or vapor (gas) upon heating can be used as the modifying agent 21. Examples of the modifying agent 21 which remains in a liquid state at room temperature include: pure water, such as distilled water and ion exchange water; aqueous solutions of various kinds; monohydroxy alcohols, such as methanol and isopropyl alcohol; glycols, such as ethylene glycol and triethylene glycol; aromatic hydrocarbon solvents, such as toluene and xylene; etc. The aqueous solutions of various kinds and glycols are particularly preferable as the modifying agent 21, because the former is safe and easy to handle during the practical use and the latter can attain a high degree of supersaturation. Also, examples of the modifying agent 21 which remains in the solid state at room temperature include: osmium tetroxide, diacetoamide, ethyl carbamate, etc.

The particles 22 include, but not limited to: aerosol particles, mist particles, fume, etc. General examples of the particles 22 include: inorganic particles, such as metal particles and metal compound particles; organic particles, such as plastic particles and latex particles; etc. The particle modifying method of the present embodiment can be suitably used for the particles 22 whose primary average particle size ranges from some nm to some tens $\mu$m. The present particle modifying method can be applied to particles used in diversified fields, for example, the particles used as a pigment for ink, such as carbon black, the particles used as an electrophotographic developing agent, particles used as a raw material for cosmetics, particles used for medicines, etc.

Figure 3:
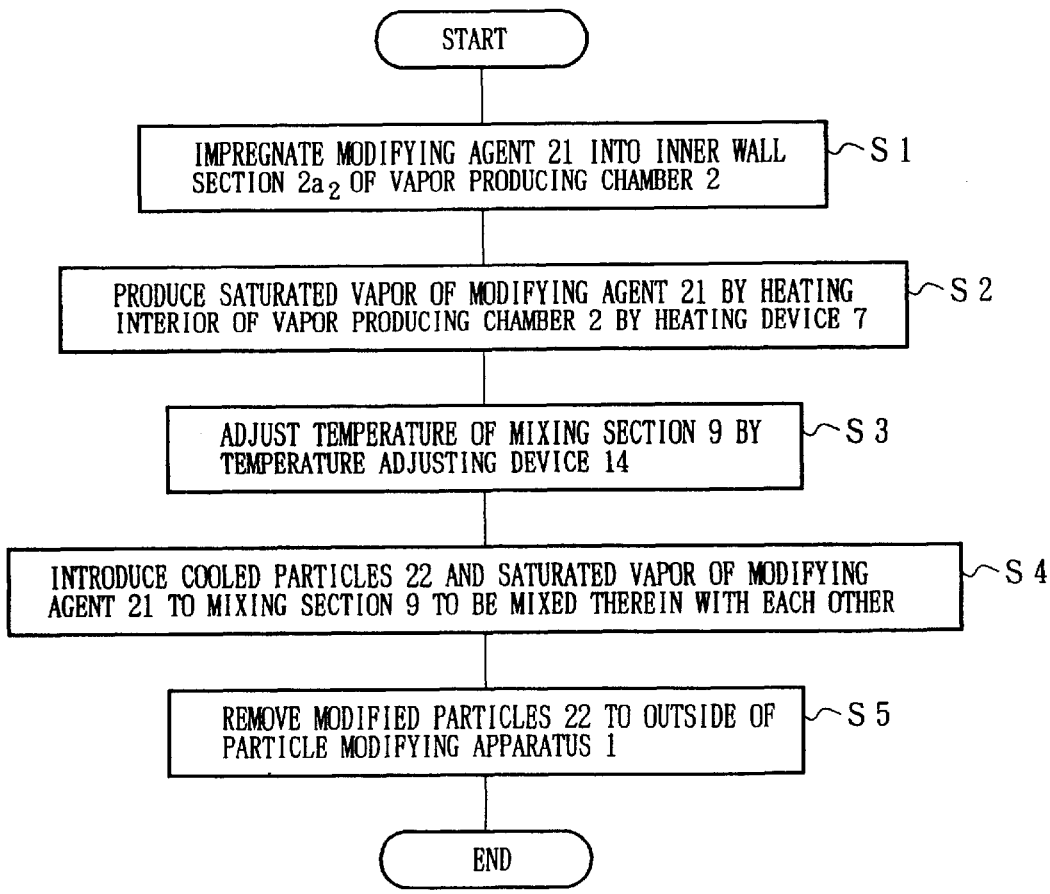
FIG. 3 is a flowchart detailing the particle modifying method in accordance with the above embodiment of the present invention.

Next, the particle modifying method implemented by the particle modifying apparatus 1 will be explained with reference to the flowchart in FIG. 3 and a control block diagram of FIG. 2.

When the particles 22 are subjected to the modifying treatment by the particle modifying apparatus 1, the modifying agent 21 is preserved in the reservoir 2c in the vapor producing chamber 2 while being impregnated to the inner wall surface section $2a_2$ (S1).

Then, the interior of the vapor producing chamber 2 is heated to produce a saturated vapor of the modifying agent 21 in the space 2b (S2). The heating device 7 heats the interior of the vapor producing chamber 2 based on the control signal received from the control device 100 of FIG. 2. When the heating device 7 is activated, the heat generated by the hater 7a is conveyed to the inner wall section $2a_2$ and space 2b through the outer wall section $2a_1$, whereby the inner wall section $2a_2$ and space 2b are heated. The temperatures of the inner wall section $2a_2$ and space 2b are measured by the thermometer 8. The saturated vapor of the modifying agent 21 is produced in the space 2b, and fills the space 2b by the above heating. Under these conditions, the saturated vapor of the modifying agent 21 is transported to the vapor outlet 2e as the modifying agent transport gas is introduced into the space 2b from the clean gas supplying device 25.

Then, the control section 100 of FIG. 2 controls the temperature adjusting device 14 provided in the mixing section 9, and adjusts the temperature T4 of the treatment space 9b to satisfy the following inequality, T2>T4>T3>T1, T2>T3>T4>T1, or T2>T3>T1>T4 (S3).

Next, the particles 22 to be modified, which are cooled by the cooling devices 10 and 13 under the control of the control device 100 of FIG. 2 in advance, are introduced into the space 2b near the pole of the vapor outlet 2e of the vapor producing chamber 2, whereby a mixed gas of the cooled particles 22 and the saturated vapor of the modifying agent 21 is obtained. Here, the particles 22 are introduced into the space 2b together with the particle transport gas through the particle inlet 20, and further transported to the mixing section 9 together with the saturated vapor of the modifying agent 21 filling the space 2b. As shown in FIG. 4, in the state of a mixed gas, the saturated vapor of the modifying agent 21 surrounds the particles 22 (state (i)). Then, the mixed gas is introduced into the treatment space 9b in the mixing section 9 (S4). In the mixing section 9, the saturated vapor of the modifying agent 21 is turned into a supersaturated state by the cooled particles 22, and as shown in FIG. 4, the condensation reaction of the modifying agent 21 takes place on the surface of the particles 22 (state (ii)). Consequently, a film of the modifying agent 21 is formed on the surface of the particles 22, thereby modifying the surface properties of the particles 22 (state (iii)).

Subsequently, the particles 22, to which the modifying treatment has been applied in the treatment space 9b in the mixing section 9, namely, the modified particles, are released from the particle modifying apparatus 1 through the particle outlet 6 (S5), whereupon the treatment ends.

Here, the principle of how a film of the modifying agent 21 is formed on the surface of the particles 22 by the above particle modifying method will be described in detail.

Figure 5:
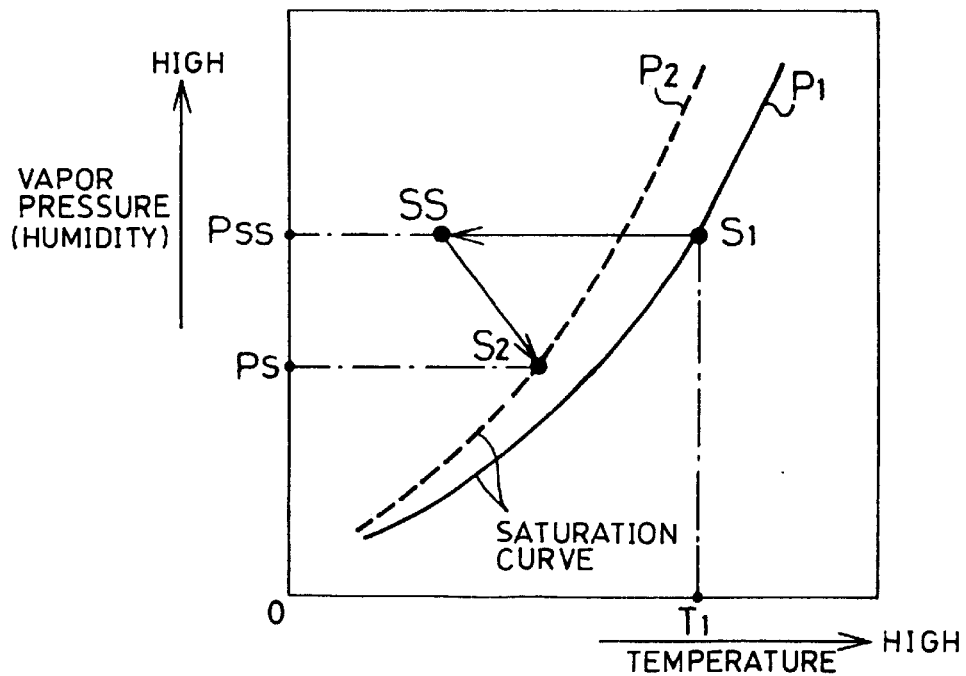
FIG. 5 is a graph explaining a principle of the particle modifying treatment by the particle modifying method of FIG. 3.

As shown in FIG. 5, as the environment of the particles 22 in which a saturation point $S_1$ at a temperature T (at vapor pressure Pss on saturation curve $P_1$) shifts to a supersaturation point SS (temperature drops from T while vapor pressure Pss is maintained) and further to a saturation point $S_2$ (saturated vapor pressure Ps on saturation curve $P_2$), that is, the supersaturated state is turned to the saturated state, the aforementioned condensation takes place on the surface of the particles 22 as illustrated in FIG. 4. Consequently, a film of the modifying agent 21 grows on the surface of the particles 22, and stops growing at the saturation point $S_2$. In this case, an amount of the vapor of the modifying agent 21 condensed on the surface of the particles 22 equals to an amount of the vapor of the modifying agent 21 corresponding to a difference of the vapor pressures (Pss-Ps) between the supersaturation point SS and saturation point $S_2$ in FIG. 5.

Thus, it is preferable to use a modifying agent 21 which can attain a high degree of supersaturation, but the modifying agent 21 is not especially limited. because, even when the modifying agent 21 is a liquid having a lower degree of supersaturation, the film of the modifying agent 21 formed on the surface of the particles 22 can be gradually thickened by repeating the modifying treatment as will be described below in Embodiment 2.

EXAMPLE 1

Figure 6:
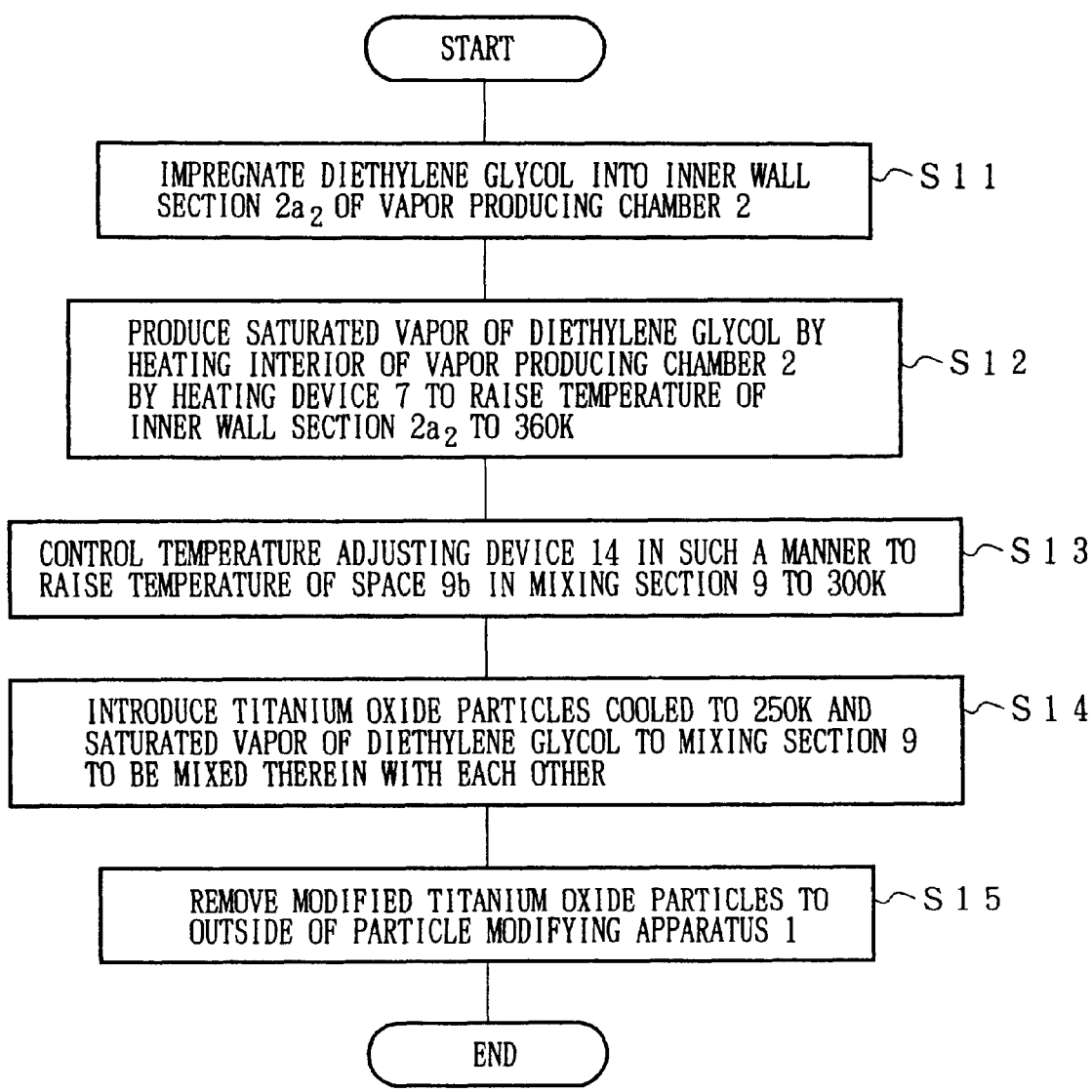
FIG. 6 is a flowchart detailing an example of the particle modifying method of FIG. 3.

Next, an example modifying treatment effected under desired conditions by the particle modifying method using the particle modifying apparatus 1 shown in FIGS. 1(a) and 1(b) will be explained with reference to the flowchart in FIG. 6 and the control block diagram of FIG. 2. Note that the actions in S11–S15 of FIG. 6 are identical with those in S1–S5 of FIG. 3.

To begin with, diethylene glycol is impregnated into the inner wall section $2a_2$ of the vapor producing chamber 2 as the modifying agent 21 (S11), and the heating device 7 heats the interior of the vapor producing chamber 2 to raise a temperature of the inner wall section $2a_2$ to 360K under the control of the control section 100 (S12), whereby a saturated vapor of diethylene glycol is produced in the space 2b. Then, the control section 100 controls the temperature adjusting device 14 provided in the mixing section 9 to heat the mixing section 9 to raise a temperature of the treatment space 9b in the mixing section 9 to 300K (S13).

Next, titanium oxide particles, having an average particle size of 0.5 μm, concentration of particles of $10^{10}/m^3$, and a temperature of 250K, are introduced into the space 2b in the vapor producing chamber 2 through the particle inlet 20 as the particles 22. The introduced titanium oxide particles are transported to the mixing section 9 together with the saturated vapor of diethylene glycol filling the space 2b. Consequently, the saturated vapor of diethylene glycol and titanium oxide particles are mixed in the mixing section 9, whereupon a mixed gas of the saturated vapor of diethylene glycol and titanium oxide particles is obtained (S14). Here, the saturated vapor of diethylene glycol is cooled by the titanium oxide particles and turned into a supersaturated state. Consequently, diethylene glycol condenses on the surface of the titanium oxide particles, and the surface of the titanium oxide particles is coated with a film of diethylene glycol. Thus, obtained as the final products by the above steps are the modified particles having the titanium oxide particles as the nuclei and coated with diethylene glycol.

Detection by the optical detecting device 3 reveals that the modified particles have a substantially uniform particle size with a primary average particle size of 1.1 μm. The modified titanium oxide particles thus obtained are released from the particle modifying apparatus 1 through the particle outlet 6 (S15), whereupon the modifying treatment ends.

EXAMPLE 2

Another example modifying treatment effected under desired conditions by the particle modifying method using the particle modifying apparatus 1 shown in FIGS. 1(a) and 1(b) will be explained with reference to the flowchart in FIG.

Figure 7:
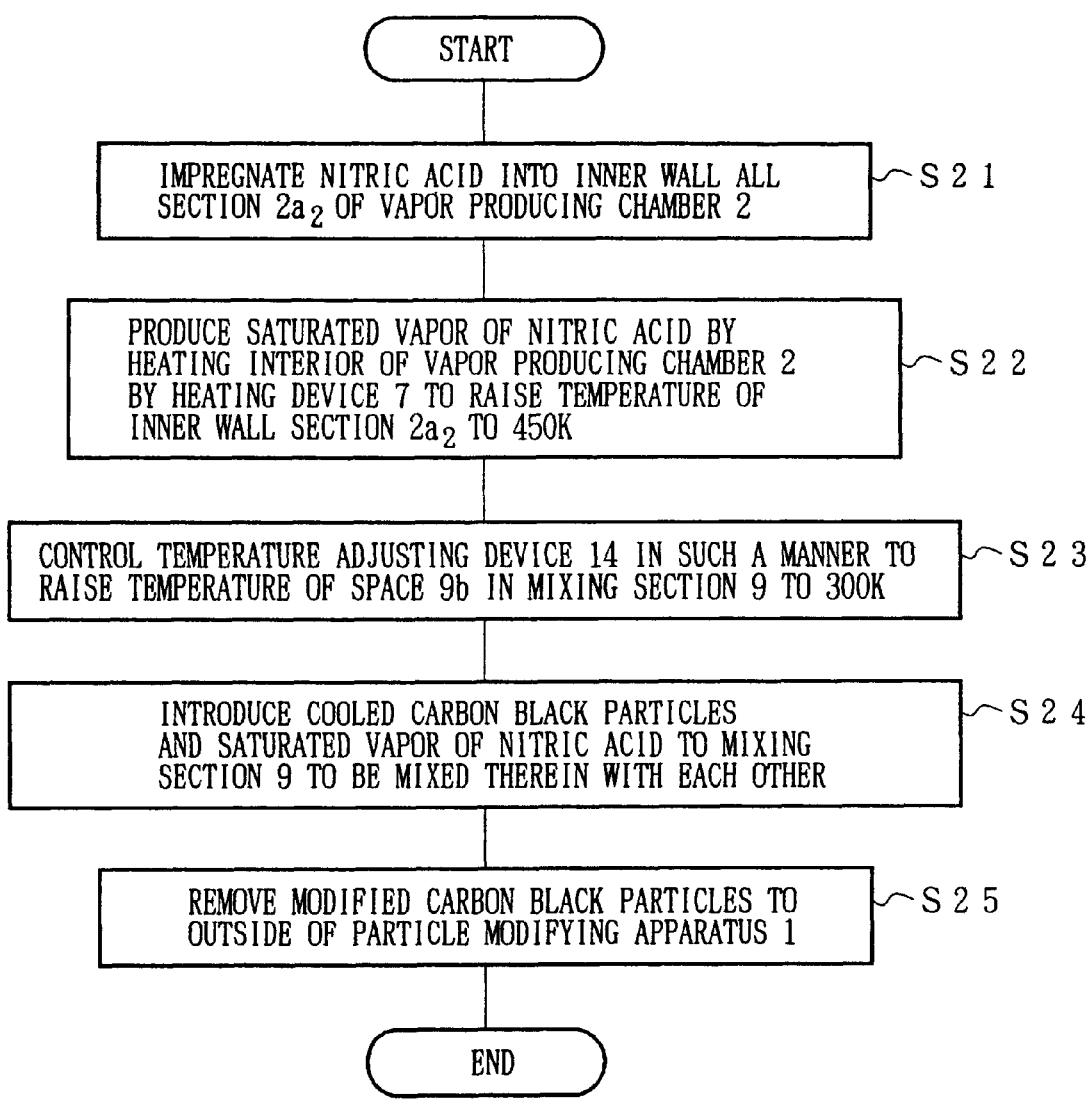
FIG. 7 is a flowchart detailing another example of the particle modifying method of FIG. 3.

7 and the control block diagram of FIG. 2. Note that the actions in S21–S25 of FIG. 7 are identical with those in S1–S5 of FIG. 3.

To begin with, nitric acid is impregnated into the inner wall section $2a_2$ of the vapor producing chamber 2 as the modifying agent 21 (S21), and the heating device 7 heats the interior of the vapor producing chamber 2 to raise a temperature of the inner wall section $2a_2$ to 450K under the control of the control section 100 (S22), whereby a saturated vapor of nitric acid is produced in the space 2b. Then, the control section 100 controls the temperature adjusting device 14 provided in the mixing section 9 to heat the mixing section 9 to raise a temperature of the treatment space 9b in the mixing section 9 to 300K (S23).

Next, carbon black particles, having a geometrical means particle size of 0.1 μm and concentration of particles of $10^{12}/m^3$, are introduced into the space 2b in the vapor producing chamber 2 through the particle inlet 20 as the particles 22. The introduced black carbon particles are transported to the mixing section 9 together with the saturated vapor of nitric acid filling the space 2b. Consequently, the saturated vapor of nitric acid and carbon black particles are mixed in the mixing section 9, whereupon a mixed gas of the saturated vapor of nitric acid and carbon black particles is obtained (S24). Here, the saturated vapor of nitric acid is cooled by the carbon black particles and turned into a supersaturated state. Consequently, nitric acid condenses on the surface of the carbon black particles, and the surface of the carbon black particles is coated with a film of nitric acid. Hence, the surface properties of the carbon black particles are modified.

The modified carbon black particles thus obtained are released from the particle modifying apparatus 1 through the particle outlet 6 (S25), whereupon the modifying treatment ends.

The modified carbon black particles and non-modified carbon black particles are separately mixed with super-pure water with stirring, and the wettability of the particles of each is checked. Then, it turned out that the non-modified carbon black particles do not wet with the super-pure water and remain afloat on the surface. By contrast, the modified carbon black particles wet with the super-pure water and are dispersed/suspended therein.

This reveals that the carbon black particles as a pigment modified by the present particle modifying method can attain better wettability.

EXAMPLE 3

Figure 20:
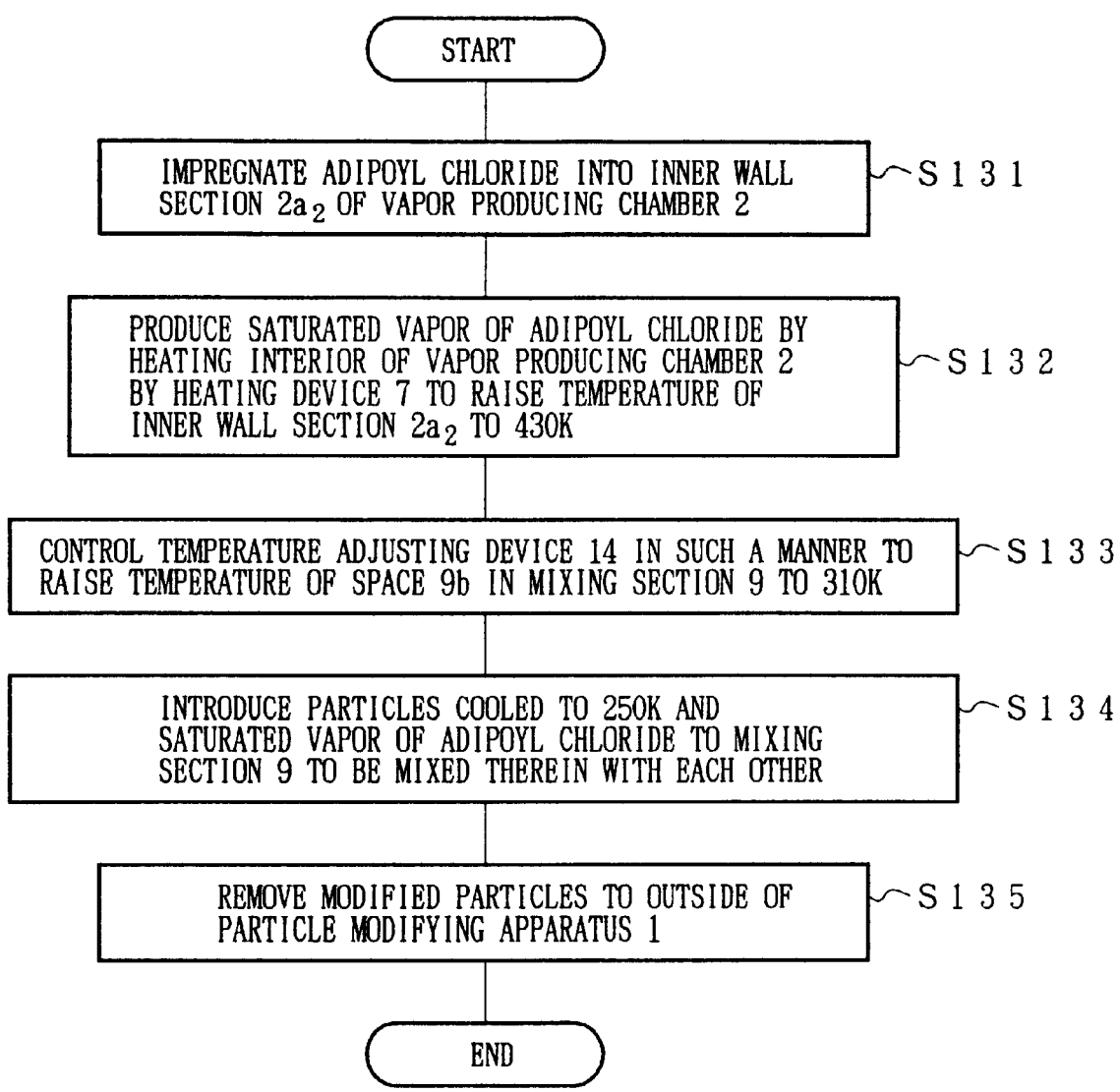
FIG. 20 is a flowchart detailing still another example of the particle modifying method of FIG. 3.

Still another example modifying treatment effected under desired conditions by the particle modifying method using the particle modifying apparatus 1 shown in FIGS. 1(a) and 1(b) will be explained with reference to the flowchart in FIG. 20.

To begin with, adipoyl chloride is impregnated into the inner wall section $2a_2$ of the vapor producing chamber 2 as the modifying agent 21 (S131), and the heating device 7 heats the interior of the vapor producing chamber 2 to raise a temperature of the inner wall section $2a_2$ to 430K under the control of the control section 100 (S132), whereby a saturated vapor of adipoyl chloride is produced in the space 2b. Then, the control section 100 controls the temperature adjusting device 14 provided in the mixing section 9 to heat the mixing section 9 and raise a temperature of the treatment space 9b in the mixing section 9 to 310K (S133).

Next, particles of a mixed aqueous solution prepared by mixing 1,6-hexanediamine with sodium hydroxide aqueous solution are introduced into the space 2b in the vapor producing chamber 2 through the particle inlet 20 as the particles 22. The introduced particles are transported to the mixing section 9 together with the high-temperature saturated vapor of adipoyl chloride filling the space 2b. Consequently, the saturated vapor of adipoyl chloride and particles are mixed in the mixing section 9, whereupon a mixed gas of the saturated vapor of adipoyl chloride and the particles is obtained (S134).

Here, the saturated vapor of adipoyl chloride is cooled by the particles and turned into a supersaturated state. Consequently, adipoyl chloride condenses on the surface of the particles, and the surface of the particles is coated with a film of adipoyl chloride. This triggers a reaction of 1,6-hexanediamine contained in the particles and adipoyl chloride on the surface of the particles, whereby polyamide resin is produced as a reaction product. As a consequence, modified particles coated with a film of polyamide resin are obtained.

Detection by the optical detecting device 3 reveals that the modified particles have a substantially uniform particle size with a primary average particle size of 2 μm. The modified particles thus obtained are released from the particle modifying apparatus 1 through the particle outlet 6 (S135), whereupon the modifying treatment ends.

As has been explained, according to the particle modifying method using the particle modifying apparatus 1, the particle modifying treatment is effected in the following steps of:

(1) producing the saturated vapor of the modifying agent 21 in the space 2b in the vapor producing chamber 2, while introducing the cooled particles 22 into the space 2b;

(2) sending the saturated vapor of the modifying agent 21 and cooled particles 22 to the mixing section 9 to turn the saturated vapor of the modifying agent 21 into the supersaturated vapor by the cooled particles 22, so that a film of the modifying agent 21 is formed on the surface of the cooled particles 22; and (3) releasing the resulting modified particles from the mixing section 9.

Thus, the particle modifying treatment can be effected continuously by successively introducing the particles 22 into the space 2b from the particle inlet 20.

Also, the particle modifying treatment can be effected by letting the modifying agent 21 condense on the surface of the particles 22 without any treatment such that causes the particles 22 to be electrically charged, for example, the stirring of the particles 22. Further, since the supersaturated atmosphere of the modifying agent 21 is obtained by a simple method of cooling the saturated vapor of the modifying agent 21, the manipulation in the modifying treatment and the modifying apparatus can be further simplified. Moreover, since the saturated vapor of the modifying agent 21 is produced by heating the modifying agent 21, the saturated vapor of the modifying agent 21 can be readily cooled later to obtain the supersaturated atmosphere of the same.

In the above explanation, the temperature adjusting device 14 adjusts the temperature T4 of the treatment space 9b in the mixing section 9 to stay above the temperature T3 of the mixed gas. However, the temperature adjusting device 14 may adjust the temperature T4 of the treatment space 9b in the mixing section 9 to stay below the temperature T3 of the mixed gas. In the former case, that is, T4>T3, the modified particles having a substantially uniform particle size are obtained, and in the latter case, that is, T4<T3, the larger modified particles having a substantially uniform particles size are obtained. This is because a degree of supersaturation of the vapor of the modifying agent 21 increases in the latter case and so does an amount of the vapor of the modifying agent 21 condensed on each particle 22.

Embodiment 2

Referring to the accompanying drawings, the following description will describe another example embodiment of the present invention. Hereinafter, like components are labeled with like reference numerals with respect to Embodiment 1, and the description of these components is not repeated for the explanation's convenience.

Figure 8:
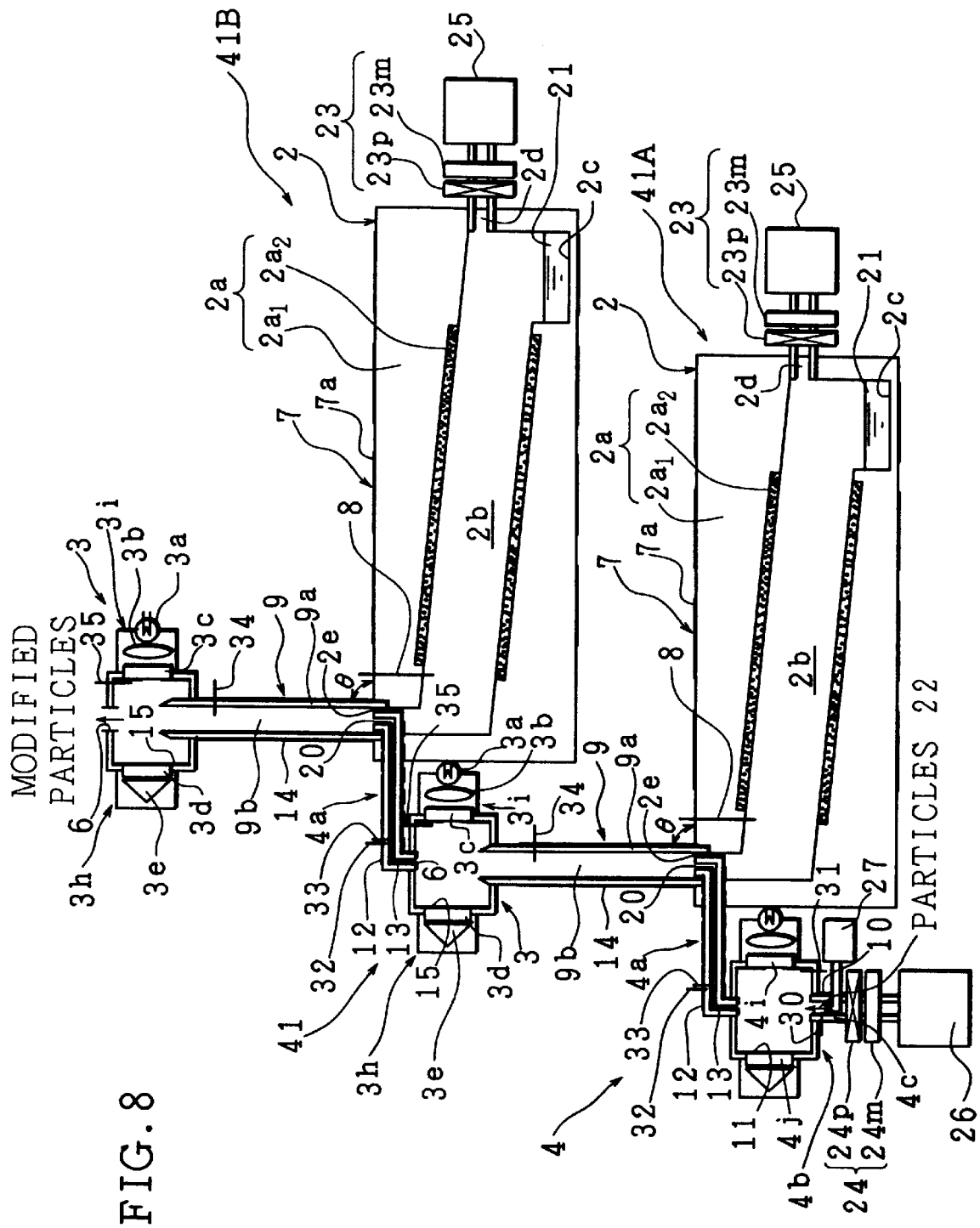
FIG. 8 is a vertical cross section showing a particle modifying apparatus for implementing a particle modifying method in accordance with another example embodiment of the present invention.

As shown in FIG. 8, a particle modifying apparatus 41 used to implement the particle modifying method of the present embodiment comprises two particle modifying apparatuses 41A and 41B, so that the modifying treatment is effected repetitively to the same particles 22 using one kind or different kinds of the modifying agents 21.

The particle modifying apparatus 41A is of the same arrangement of the particle modifying apparatus 1, and the particle modifying apparatus 41B is of the same arrangement of the particle modifying apparatus 1 except that the optical detecting device 4*b*, connecting pipe 4*c*, clean gas supplying device 26, particle supplying device 27, cooling device 10, heating device 11, impurity removing device 24, and thermometers 30 and 31 are omitted.

As shown in FIG. 8, in the particle modifying apparatus 41, the particle outlet 6 of the particle modifying apparatus 41A in the first stage is connected to the particle supplying pipe 4*a* of the particle modifying apparatus 41B in the second stage. Thus, the particle modifying apparatus 41 can effect the particle modifying treatment twice in succession. When the particle modifying treatment should be effected repetitively more than twice, as many particle modifying apparatus 1 of FIGS. 1(*a*) and 1(*b*) as necessary are connected in series.

As previously mentioned, the higher a degree of supersaturation of the modifying agent 21, the thicker the film of the modifying agent 21 coating the particles 22. Thus, when the modified particles of a larger particle size are desired, it is preferable to use the modifying agent 21 having a higher degree of supersaturation. However, some kinds of the modifying agent 21 can not attain a sufficiently high degree of supersaturation to form a film of a desired thickness in a single treatment.

Also, if a degree of supersaturation of the modifying agent 21 is too high, the modifying agent 21 may undergo the self-condensation to form particles besides the condensation using the particles 22 as the nuclei.

Figure 9:
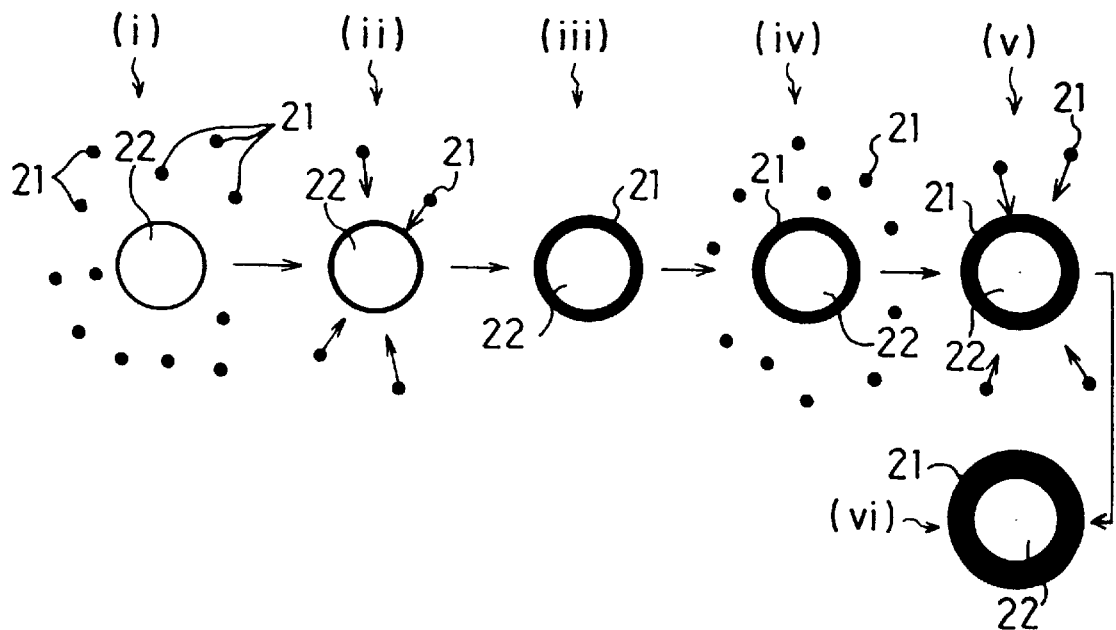
FIG. 9 is a view explaining the steps of another particle modifying process of the present invention.

Thus, according to the particle modifying method of the present embodiment, as shown in FIG. 9, the treatment of forming the film of the modifying agent 21 on the surface of the particles 22 is effected repetitively to the same particles 22, so that a film of the modifying agent 21 of a desired thickness can be formed on the surface of the particles 22 even when the modifying agent 21 has a low degree of supersaturation.

To be more specific, the states (i) through (iii) in FIG. 9 are same as those in FIG. 4, and represent the treatment effected by the particle modifying apparatus 41A. Then, the resulting modified particles are introduced to the treatment space 9*b* in the mixing section 9 in the particle modifying apparatus 41B (state (iv)), and the modifying agent 21 is let condense in the same manner as in the state (ii) (state (v)). Consequently, as shown in the state (vi), the modifying particles having a thicker film of the modifying agent 21 are obtained.

Figure 10:
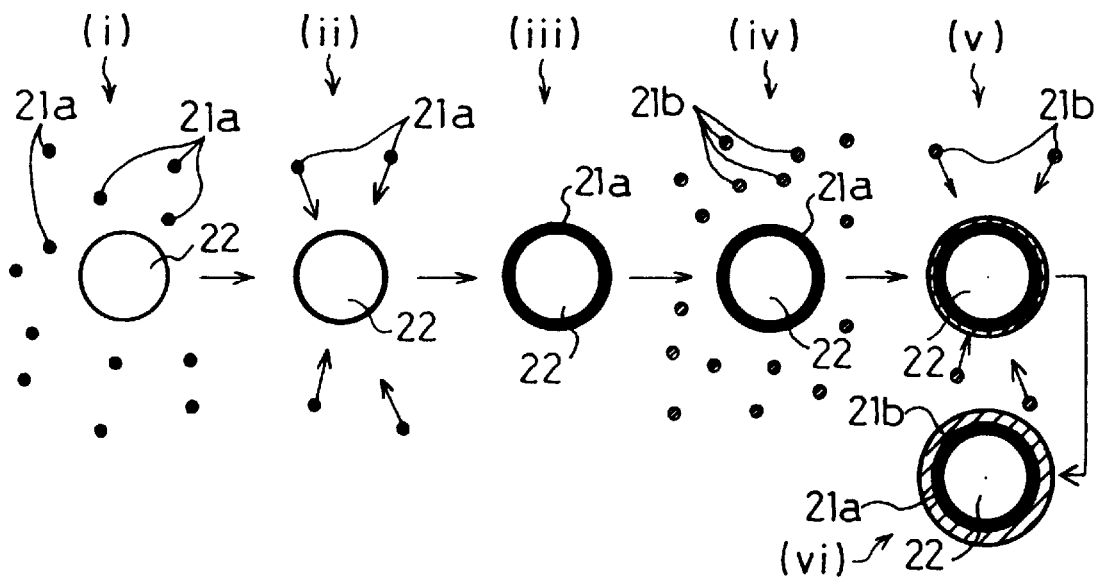
FIG. 10 is a view explaining the steps of still another particle modifying process of the present invention.

Also, as shown in FIG. 10, by effecting the treatment of forming a film of the modifying agent 21 on the surface of the particles 22 repetitively to the same particles 22 using different kinds of modifying agents 21*a* and 21*b*, the modified particles of a desired particle size coated with the films of different kinds of modifying agents 21*a* and 21*b* are obtained.

To be more specific, the states (i) through (iii) are same as those in FIGS. 4 and 9, and represent the treatment in the particle modifying apparatus 41A. The modified particles are further transported to the particle modifying apparatus 41B, and introduced to the treatment space 9*b* in the mixing section 9 which is filled with the saturated vapor of the modifying agent 21*b* of a kind different from the modifying agent 21*a* (state (iv)). Then, the modifying agent 21*b* is let condense in the same manner as in the state (ii) (state (v)). Consequently, as shown in the state (vi), the modified particles coated with a double-layer film of the modifying agents 21*a* and 21*b* are obtained.

EXAMPLE 4

Figure 11:
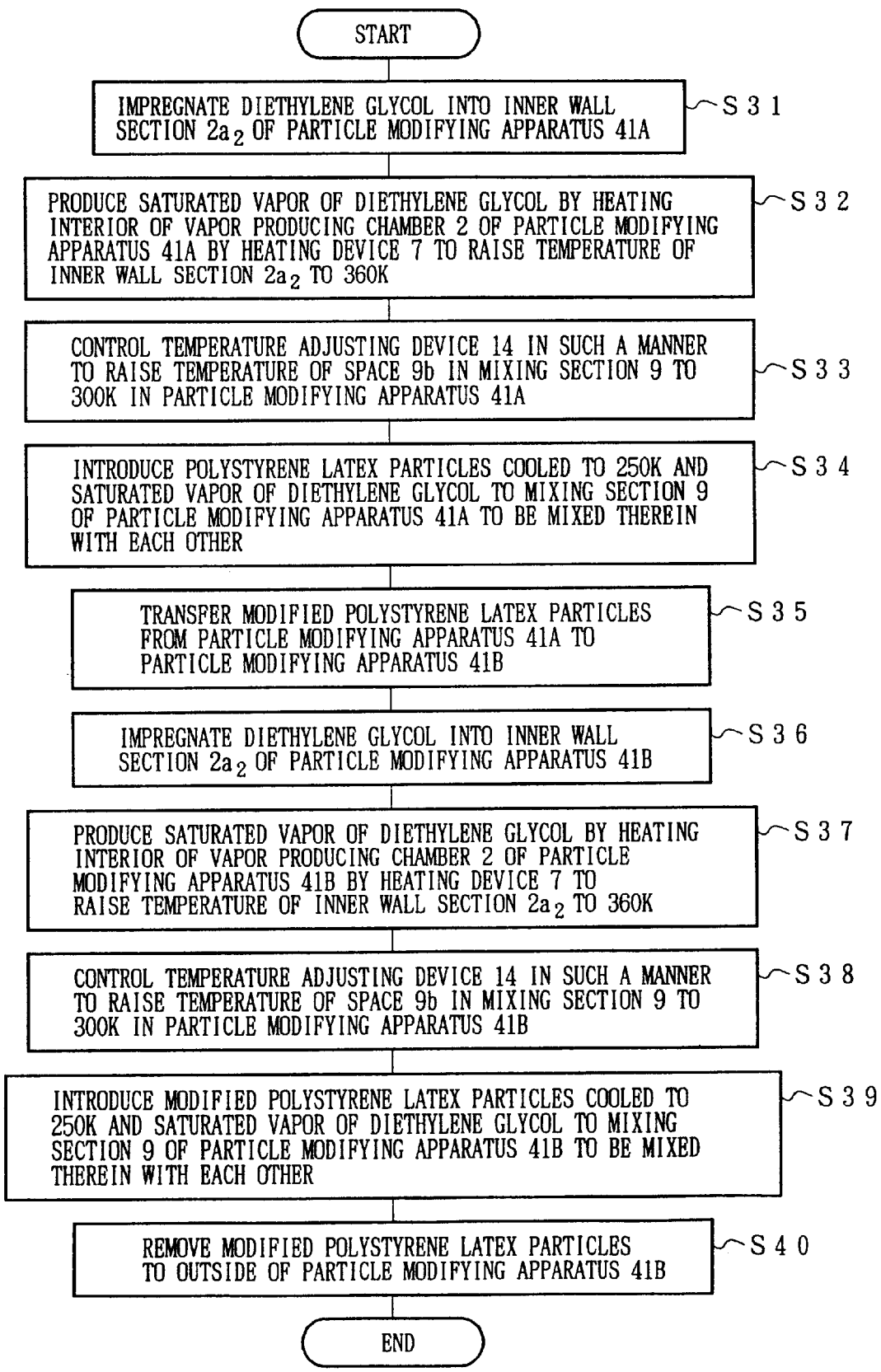
FIG. 11 is a flowchart detailing an example of the particle modifying method implemented by the particle modifying apparatus of FIG. 8.

Next, an example of the modifying treatment effected twice in succession using one kind of modifying agent 21 by the particle modifying apparatus 41 will be detailed by the flowchart in FIG. 11, and the control block diagram of FIG. 2.

To begin with, in the particle modifying apparatus 41A in the first stage, diethylene glycol is impregnated into the inner wall section 2$a_2$ of the vapor producing chamber 2 as the modifying agent 21 (S31), and the heating device 7 heats the interior of the vapor producing chamber 2 to raise a temperature of the inner wall section 2$a_2$ to 360K under the control of the control section 100 (S32), whereby a saturated vapor of diethylene glycol is produced in the space 2*b*. Then, the control section 100 controls the temperature adjusting device 14 provided in the mixing section 9 to heat the mixing section 9 to raise a temperature of the treatment space 9*b* in the mixing section 9 to 300K (S33) Next, polystyrene latex particles, having an average particle size of 0.3 μm, concentration of particles of $10^{10}/m^3$, and a temperature of 250K, are introduced into the space 2*b* in the vapor producing chamber 2 from the particle introducing section 4. The introduced polystyrene latex particles are transported to the mixing section 9 together with the saturated vapor of diethylene glycol filling the space 2*b*. Consequently, the saturated vapor of diethylene glycol and polystyrene latex particles are mixed in the mixing section 9, whereupon a mixed gas of the saturated vapor of diethylene glycol and polystyrene latex particles is obtained (S34). Here, the saturated vapor of diethylene glycol is cooled by the polystyrene latex particles and turned into a supersaturated state. Consequently, diethylene glycol condenses on the surface of the polystyrene latex particles, and the surface of the polystyrene latex particles is coated with a film of diethylene glycol.

Thus, obtained as the final products by the above steps are the modified particles having the polystyrene latex particles as the nuclei and coated with a film of diethylene glycol as well as having a substantially uniform particle size with a primary average particle size of 1.3 μm.

Then, the particles 22 treated by the particle modifying apparatus 41A in the first stage are sent to the particle modifying apparatus 41B in the second stage, and introduced further into the space 2*b* through the particle introducing pipe 4*a* (S35).

Subsequently, in the particle modifying apparatus 41B in the second stage, S36–S39 are carried out in the same manner as 531–534. Thus, obtained as the final products are the modified particles having the polystyrene latex particles as the nuclei and coated with a film of diethylene glycol as well as having a substantially uniform particle size with a primary average particle size of 2 μm. The modified particles obtained in the above manner are released from the particle outlet 6 of the particle modifying apparatus 41B, whereupon the treatment ends (S40).

EXAMPLE 5

Figure 12:
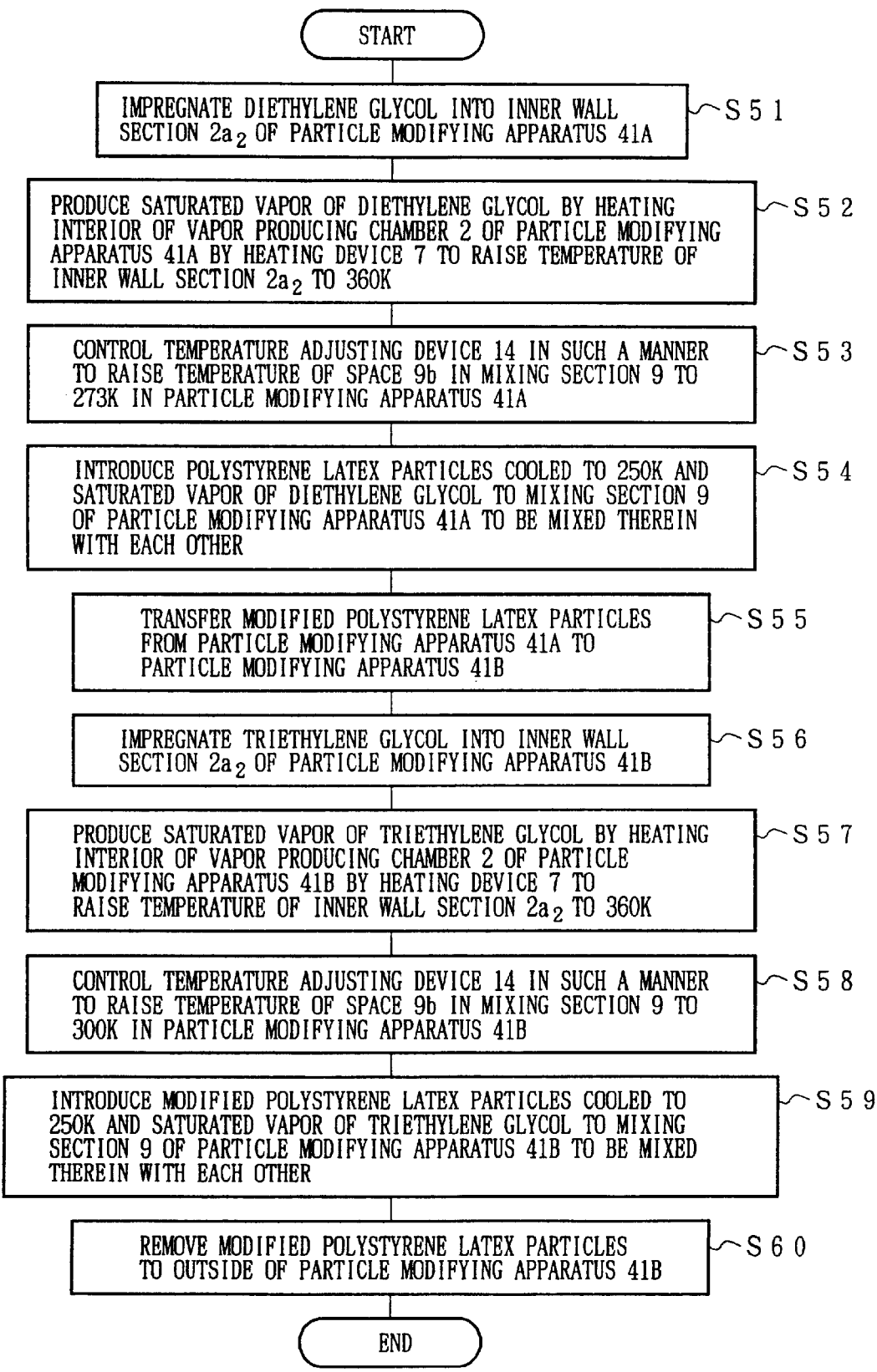
FIG. 12 is a flowchart detailing another example of the particle modifying method implemented by the particle modifying apparatus of FIG. 8.

Next, an example of the modifying treatment effected twice in succession using different kinds of modifying agents 21 by the particle modifying apparatus 41 will be detailed by the flowchart in FIG. 12, and the control block diagram of FIG. 2.

To begin with, in the particle modifying apparatus 41A in the first stage, diethylene glycol is impregnated into the inner wall section $2a_2$ of the vapor producing chamber 2 as the modifying agent 21 (S51), and the heating device 7 heats the interior of the vapor producing chamber 2 to raise a temperature of the inner wall section $2a_2$ to 360K under the control of the control section 100 (S52), whereby a saturated vapor of diethylene glycol is produced in the space 2b.

Then, the control section 100 controls the temperature adjusting device 14 provided in the mixing section 9 to heat the mixing section 9 and raise a temperature of the treatment space 9b in the mixing section 9 to 273K (S53).

Next, polystyrene latex particles, having an average particle size of 0.3 μm, concentration of particles of $10^{10}/m^3$, and a temperature of 250K, are introduced into the space 2b in the vapor producing chamber 2 through the particle inlet 20. The introduced polystyrene latex particles are transported to the mixing section 9 together with the saturated vapor of diethylene glycol filling the space 2b. Consequently, the saturated vapor of diethylene glycol and polystyrene latex particles are mixed in the mixing section 9, whereupon a mixed gas of the saturated vapor of diethylene glycol and polystyrene latex particles is obtained (S54), which is introduced into the mixing section 9. Then, diethylene glycol is turned into a supersaturated state by the cooled polystyrene latex particles, and immediately starts to condense on the surface of the polystyrene latex particles, and the surface of the polystyrene latex particles is coated with a film of diethylene glycol.

Thus, obtained as the final products by the above steps are the modified particles having the polystyrene latex particles as the nuclei and coated with a film of diethylene glycol as well as having a substantially uniform particle size with a primary average particle size of 1.5 μm.

Subsequently, the particles 22 treated by the particle modifying apparatus 41A in the first stage are sent to the particle modifying apparatus 41B in the second stage, and introduced further into the space 2b through the particle introducing pipe 4a (S55). In the particle modifying apparatus 41B in the second stage, S56–S59 are carried out in the same manner as S51–S54 except that triethylene glycol is used as the modifying agent 21.

Consequently, obtained as the final products are the modified particles having the polystyrene latex particles as the nuclei and coated with a film of diethylene glycol first and thence triethylene glycol as well as having a substantially uniform particle size with an average particle size of 2.5 μm. The modified particles obtained in the above manner are released from the particle outlet 6 of the particle modifying apparatus 41B, whereupon the treatment ends (S60).

EXAMPLE 6

Figure 21:
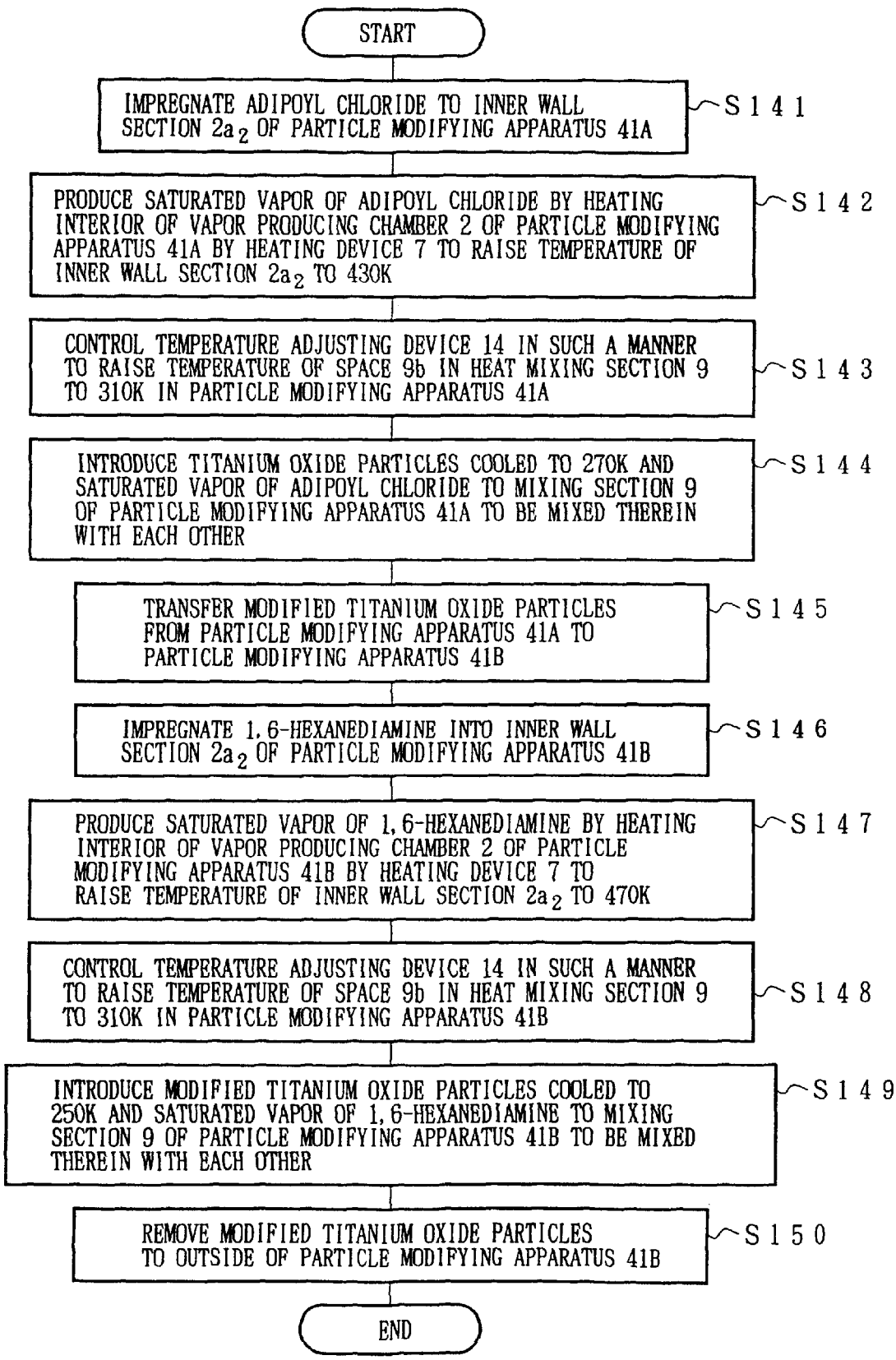
FIG. 21 is a flowchart detailing still another example of the particle modifying method implemented by the particle modifying apparatus of FIG. 8.

Next, another example of the modifying treatment effected twice in succession using different kinds of modifying agents 21 by the particle modifying apparatus 41 will be detailed by the flowchart in FIG. 21.

To begin with, in the particle modifying apparatus 41A in the first stage, adipoyl chloride is impregnated into the inner wall section $2a_2$ of the vapor producing chamber 2 as the modifying agent 21 (S141), and the heating device 7 heats the interior of the vapor producing chamber 2 to raise a temperature of the inner wall section $2a_2$ to 430K under the control of the control section 100 (S142), whereby a saturated vapor of adipoyl chloride is produced in the space 2b.

Then, the control section 100 controls the temperature adjusting device 14 provided in the mixing section 9 to heat the mixing section 9 to raise a temperature of the treatment space 9b in the mixing section 9 to 310K (S143). Next, titanium oxide particles cooled to 270K are introduced into the space 2b in the vapor producing chamber 2 through the particle inlet 20. The introduced adipoyl chloride particles are transported to the mixing section 9 together with the high-temperature saturated vapor of adipoyl chloride filling the space 2b. Consequently, the saturated vapor of adipoyl chloride and titanium oxide particles are mixed in the mixing section 9, whereupon a mixed gas of the saturated vapor of adipoyl chloride and titanium oxide particles is obtained (S144).

Here, the saturated vapor of adipoyl chloride is cooled by the titanium oxide particles and turned into a supersaturated state, whereupon adipoyl chloride starts to condense on the surface of the titanium oxide particles, and as a consequence, the surface of the titanium oxide particles is coated with a film of adipoyl chloride.

Subsequently, the particles 22 treated by the particle modifying apparatus 41A in the first stage are sent to the particle modifying apparatus 41B in the second stage, and introduced further into the space 2b through the particle introducing pipe 4a (S145). In the particle modifying apparatus 41B in the second stage, S146–S149 are carried out in the same manner as S141–S144 except that 1,6-hexanediamine is used as the modifying agent 21.

Consequently, obtained as the final products are the modified particles having the titanium oxide particles as the nuclei and coated with a film of adipoyl chloride first and thence 1,6-hexanediamine. Then, the polycondensation reaction of the film of adipoyl chloride and 1,6-hexanediamine takes place on the surface of the titanium oxide and polyamide resin is produced, whereby the modified particles coated with a film of polyamide resin are obtained.

The measurement by the optical detecting device 3 reveals that the resulting modified particles have a substantially uniform particle size with a primary particle size of 3 μm. The modified particles thus obtained are released from the particles modifying apparatus 41B through the particle outlet 6, whereupon the treatment ends (S150).

As has been explained, when more than one kind of modifying agent 21 is used, as many particle modifying apparatuses 1 of Embodiment 1 as the kinds of the modifying agent 21 are connected in series or parallel. Alternatively, a plurality kinds of modifying agents 21 may be impregnated in a single particle modifying apparatus 1, so that a film of mixed modifying agents 21 is formed on the surface of the particles 22 by effecting the modifying treatment only once.

When a plurality kinds of modifying agent 21 are used, a chemical reaction can be triggered between the plurality kinds of modifying agent 21 and the surface of the particles 22 or among the plurality kinds of modifying agents 21.

Embodiment 3

Referring to the accompanying drawings, the following description will describe still another example embodiment of the present invention. Hereinafter, like components are labeled with like reference numerals with respect to Embodiments 1 and 2, and the description of these components is not repeated for the explanation's convenience.

Figure 13:
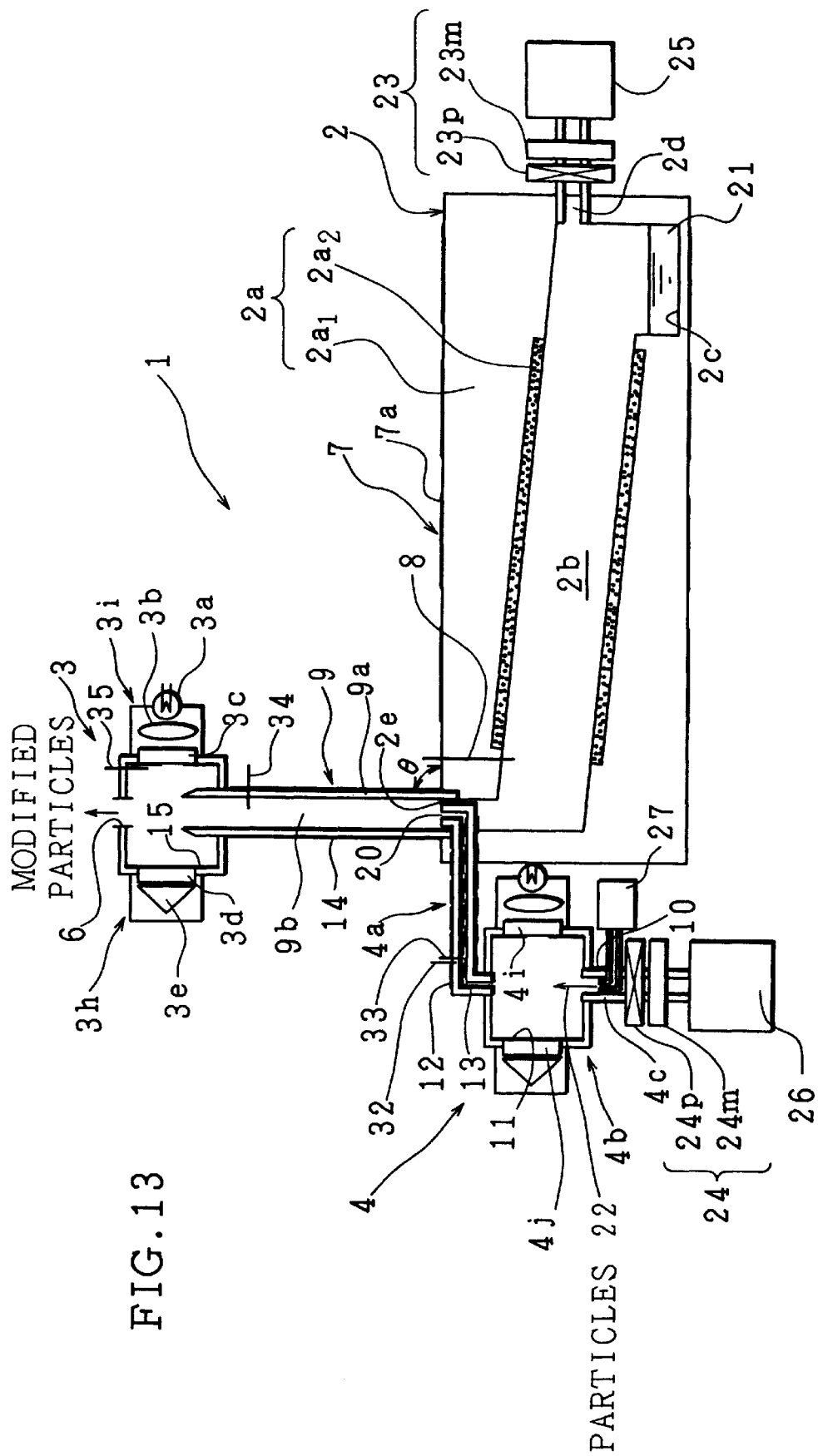
FIG. 13 is a vertical cross section showing a particle modifying apparatus for implementing a particle modifying method in accordance with still another example embodiment of the present invention.

As shown in FIG. 13, a particle modifying apparatus 51 of the present embodiment is identical with the particle modifying apparatus 1 of Embodiment 1 except that the temperature adjusting device 14 and cooling device 13 are respectively replaced with a cooling device 52 and a temperature adjusting device 53, and that the cooling device 10 and thermometers 30, 31 and 35 are omitted.

In the particle modifying apparatus 51, the particle inlet 20 is provided right before the mixing section 9, so as to minimize a drop in concentration of the saturated vapor of the modifying agent 21 filling and flowing in the vapor producing chamber 2 by the deposition on the particle introducing section 4, and temperature interference of the high-temperature interior of the vapor producing chamber 2 and the low-temperature particle introducing section 4.

According to the arrangement in which the particles 22 are introduced through the clean gas inlet 2d, the particles 22 may be possibly deteriorated by the heat in the vapor producing chamber 2. By contrast, in the particle modifying apparatus 51, since the particle inlet 20 is provided to the vapor producing chamber 2 at a side end portion of the vapor outlet 2e, the particles 22 and the vapor of the modifying agent 21 are mixed with each other right before they are introduced into the mixing section 9. Thus, the particles 22 are less susceptible to the heat inside the vapor producing chamber 2, and therefore, prevented from the deterioration caused by such heat.

The cooling device 52, provided on the outer circumference surface of the mixing section 9, cools the treatment space 9b in the mixing section 9 to turn the saturated vapor of the modifying agent 21 into a supersaturated state. The cooling device 52 is composed of, for example, a Peltier element which cools a subject through the Peltier effect. Alternatively, a device which cools a subject using liquid nitrogen, water, or an organic solvent cooled by a refrigerant like dry ice, or a Liebig condenser is available as the cooling device 52.

In the particle modifying apparatus 51, let T1 be a temperature of the particles 22 measured by the thermometer 33, T2 be a temperature of the saturated vapor of the modifying agent 21 measured by the thermometer 8, T3 be a temperature of a mixed gas obtained by mixing the particles 22 with the saturated vapor of the modifying agent 21, and T4 be a cooled temperature of the treatment space 9b in the mixing section 9, then the following inequality is established: T2>T3>T1>T4 or T2>T3>T4>T1. Thus, the temperature of the mixing section 9 is set lower, and a difference between T2 and T4 becomes larger. Under these conditions, as can be understood from FIG. 5, a very high degree of supersaturation can be obtained, thereby making it possible to obtain the modified particles of a large particle size.

The temperature adjusting device 53 adjusts a temperature of the inner wall section $4a_2$ of the particle introducing pipe 4a detected by the thermometer 33 to stay below a temperature at or above which at least the particles 22 are deteriorated, deformed, transformed, etc. According to this temperature adjustment, the particles 22 are protected from the deterioration, deformation, transformation, etc. caused by the heat during the transportation step in the particle introducing section 4 before they are mixed with the saturated vapor of the modifying agent 21 in the mixing section 9.

To allow the particle modifying apparatus 51 to carry out a series of the modifying jobs automatically, the particle modifying apparatus 51 may be additionally provided with a control device for controlling the particle supplying device 27, clean gas supplying devices 25 and 26, heating devices 7, 11, 12, and 15, cooling device 52, and temperature adjusting device 53 based on the temperature values detected by the thermometers 8, and 32–34, and the values of the particle size and the concentration of particles detected by the optical detecting devices 3 and 4*b*.

The above additional control device operates in such a manner to control:

(1) the clean gas supplying device 26 and particle supplying device 27, so that the particles 22 are supplied to the mixing section 9;

(2) the heating device 7, so that the modifying agent 21 in the vapor producing chamber 2 is turned into a saturated vapor;

(3) the clean gas supplying device 25, so that the saturated vapor of the modifying agent 21 in the vapor producing chamber 2 is transported to the mixing section 9;

(4) the cooling device 52, so that the modifying agent 21 is cooled in the mixing section 9 and turned into the supersaturated state; and (5) the particle outlet 6, so that the modified particles are released through the same.

Next, the particle modifying method implemented by the particle modifying apparatus 51 will be explained with reference to the flowchart of FIG. 14. When the particle modifying apparatus 51 effects the particle modifying treatment, the modifying agent 21 is preserved in the reservoir 2*c* and also impregnated into the inner wall section 2$a_2$ in the vapor producing chamber 2 (S71).

Then, the interior of the vapor producing chamber 2 is heated by the heating device 7 to obtain a saturated vapor of the modifying agent 21 in the space 2*b* (S72). As the heating device 7 is activated, the heat generated by the heater 7*a* is conveyed to the inner wall section 2*a*, and space 2*b* through the outer wall section 2$a_1$, whereupon the inner wall section 2$a_1$ and space 2*b* are heated. Here, a temperature of the interior of the vapor producing chamber 2 is measured by the thermometer 8. Then, a saturated vaporous atmosphere of the modifying agent 21 is produced in the space 2*b* by the above heating, and as a consequence, the vapor producing chamber 2 is filled with the saturated vapor of the modifying agent 21. Then, the saturated vapor of the modifying agent 21 in the vapor generating chamber 2 is transported to the vapor outlet 2*e*, while at the same time, the mixing section 9 is cooled by the cooling device 52 (S73).

Then, the particles 22 to be modified are introduced into the space 2*b* near the vapor outlet 2*e* of the vapor producing chamber 2 (S74). In this case, the particles 22 are introduced into the space 2*b* through the particle inlet 20. The particles 22 introduced into the space 2*b* are further transported to the cooled mixing section 9 together with the saturated vapor of the modifying agent 21 filling the space 2*b*. By the above steps, a mixed gas of the saturated vapor of the modifying agent 21 and the particles 22 is obtained in the space 2*b* in the vapor producing chamber 2. Under these conditions, as illustrated in the state (i) of FIG. 4, the vapor of the modifying agent 21 surrounds the particles 22, and the saturated vapor of the modifying agent 21 is immediately turned into the supersaturate state, and then, as illustrated in the state (ii) in FIG. 4, the condensation reaction of the modifying agent 21 takes place on the surface of the particles 22. Consequently, as illustrated in the state (iii) of FIG. 4, a film of the modifying agent 21 is formed on the surface of the particles 22, whereby the surface properties of the particles 22 are modified.

Then, the treated particles 22 in the treatment space 9b, that is, the modified particles, are taken out from the mixing section 9, whereupon the treatment ends (S75).

It is preferable to use a modifying agent which can attain a high degree of saturation. However, the modifying agent is not especially limited, because even when a liquid of modifying agent having a low degree of saturation is used, a film formed on the surface of the particles 22 can be thickened gradually by repeating the modifying treatment as will be described in Embodiment 4 below.

EXAMPLE 7

Figure 14:
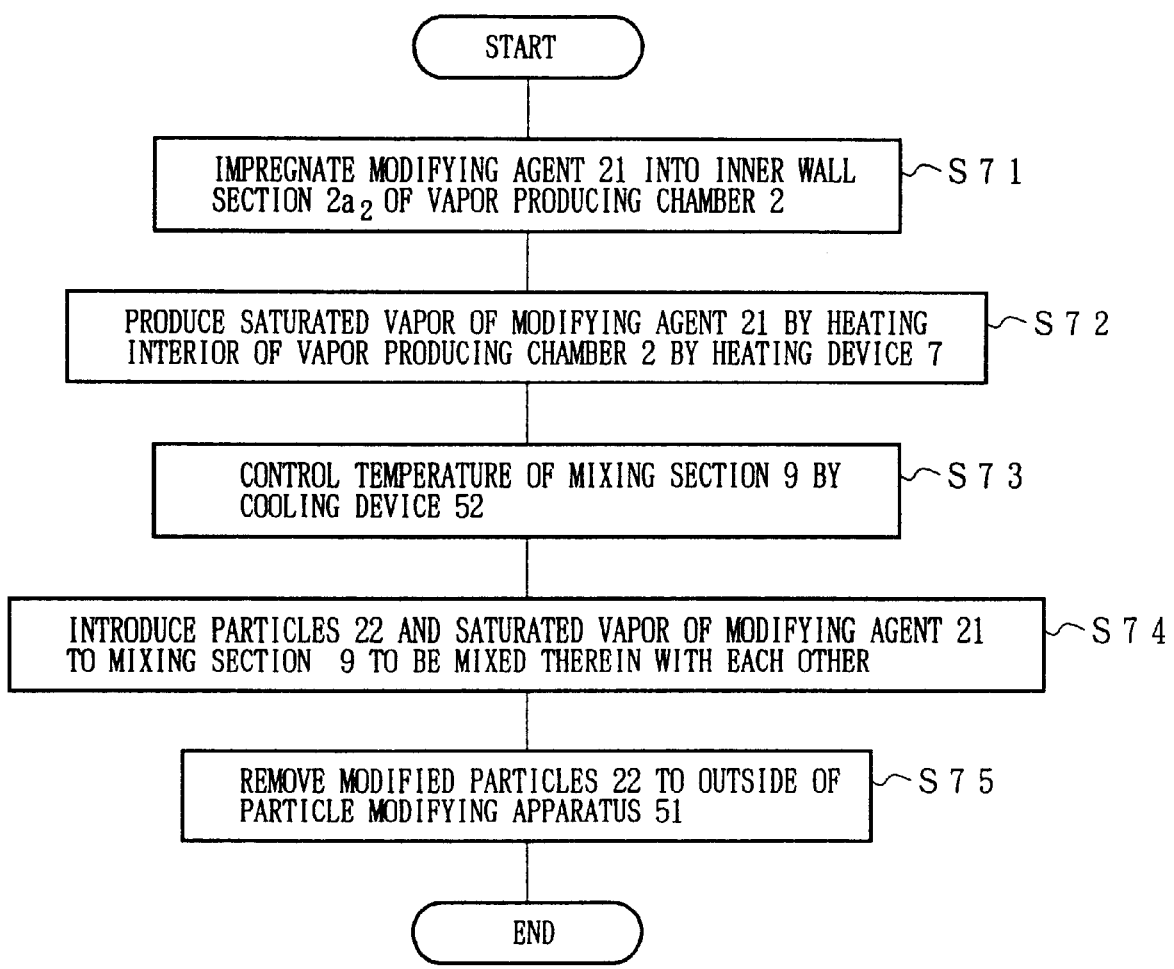
FIG. 14 is a flowchart detailing a particle modifying method implemented by the particle modifying apparatus of FIG. 13.
Figure 15:
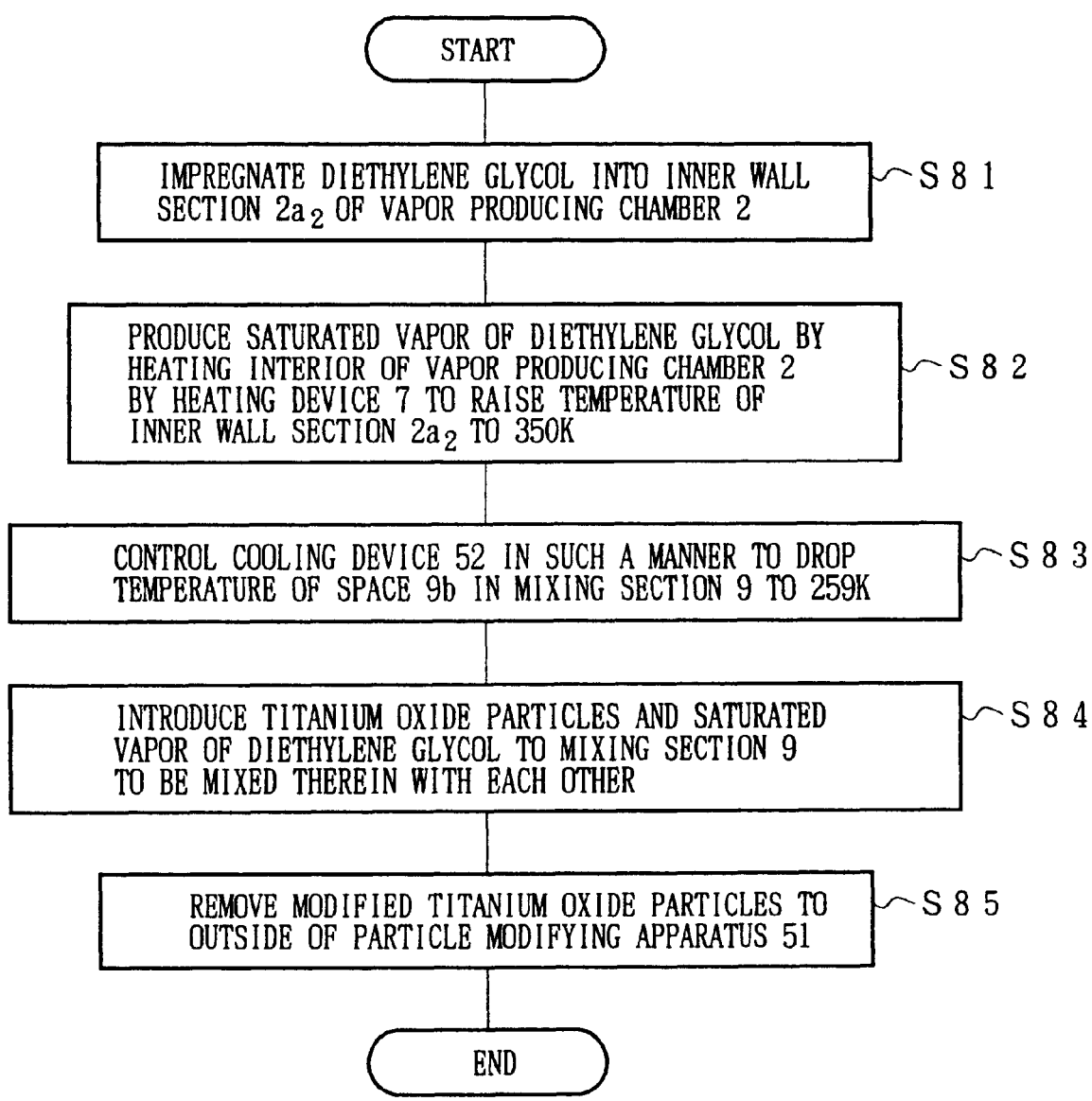
FIG. 15 is a flowchart detailing an example of the particle modifying method implemented by the particle modifying apparatus of FIG. 13.

Another example of the modifying treatment effected under desired conditions by the particle modifying method implemented by the particle modifying apparatus 51 of FIG. 13 will be explained with reference to the flowchart of FIG. 15. Note that the actions taken in S81–S85 of FIG. 15 are identical with the actions taken in S71–S75 of FIG. 14, respectively.

To begin with, diethylene glycol is impregnated into the inner wall section $2a_2$ of the vapor producing chamber 2 as the modifying agent 21 (S81). Then, the interior of the vapor producing chamber 2 is heated by the heating device 7 to raise a temperature of the inner wall section $2a_2$ to 350K (S82), whereby a saturated vapor of diethylene glycol is produced in the space 2b. Also, the mixing section 9 is cooled by the cooling device 52 to drop a temperature of the pipe wall section 9a to 259K (S83).

Then, titanium oxide particles having an average particle size of 0.5 μm and concentration of particles of $10^{10}/m^3$ are introduced into the space 2b in the vapor producing chamber 2 through the particle inlet 20. Accordingly, the titanium oxide particles introduced to the space 2b are transported across the space 2b together with the saturated vapor of diethylene glycol filling the space 2b. Then, a mixed gas of the saturated vapor of diethylene glycol and titanium oxide particles is obtained in the mixing section 9, which is cooled therein by the cooling device 52 (S84), whereupon diethylene glycol is turned into a supersaturated state. Consequently, diethylene glycol condenses on the surface of the titanium oxide particles, and the surface of the titanium oxide particles is coated with a film of diethylene glycol.

Thus, obtained as the final products by the above steps are the modified particles having the titanium oxide particles as the nuclei and coated with diethylene glycol as well as having a substantially uniform particle size with a primary average particle size of 3 μm. Then, the treated titanium oxide particles are introduced to the outside of the particle modifying apparatus 51, whereupon the treatment ends (S85).

EXAMPLE 8

Figure 16:
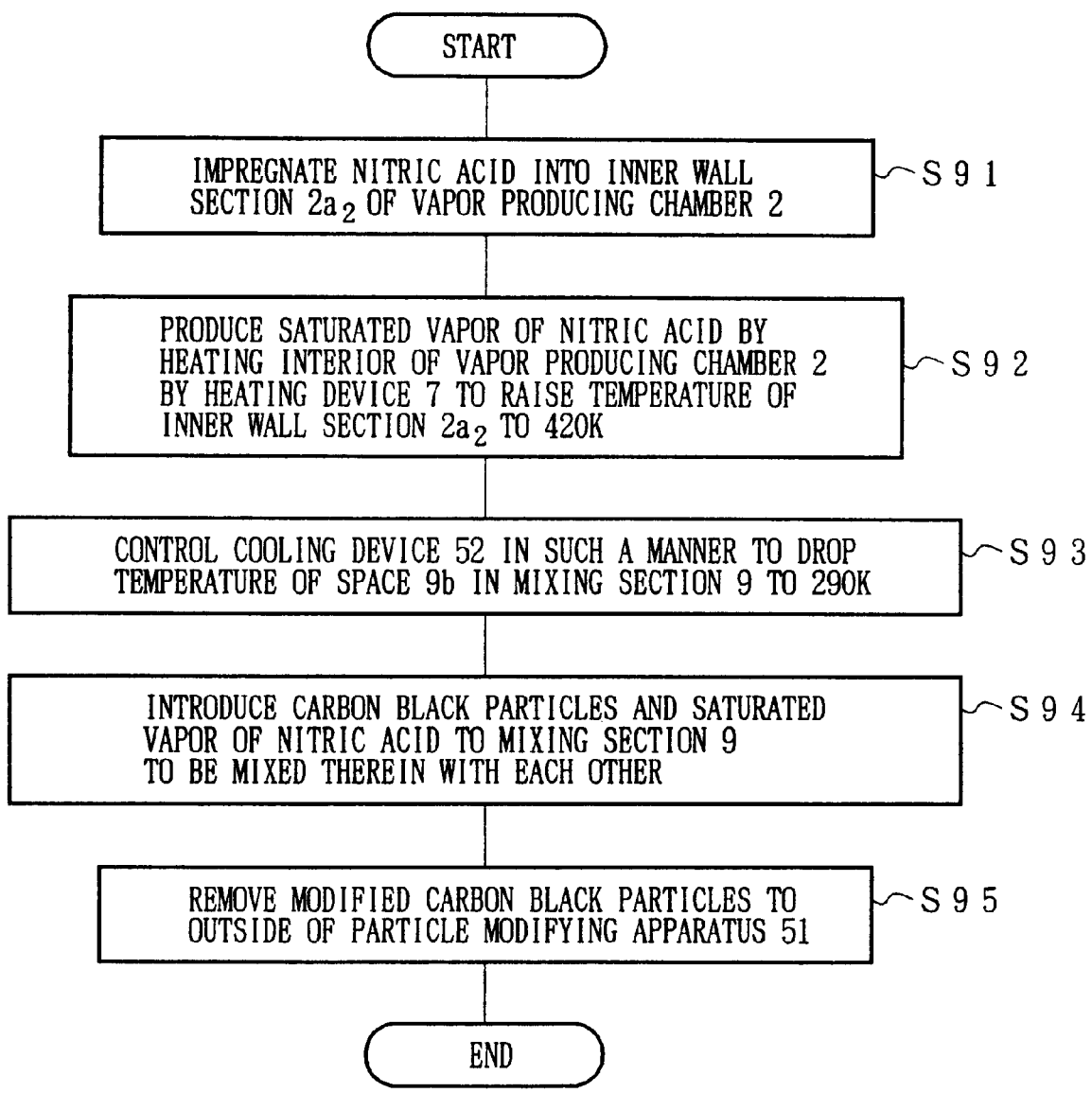
FIG. 16 is a flowchart detailing another example of the particle modifying method implemented by the particle modifying apparatus of FIG. 13.

Still another example of the modifying treatment effected under desired conditions by the particle modifying method implemented by the particle modifying apparatus 51 of FIG. 13 will be explained with reference to the flowchart of FIG. 16. Note that the actions taken in S91–S95 of FIG. 16 are identical with the actions taken in S71–S75 of FIG. 14, respectively.

To begin with, nitric acid is impregnated into the inner wall section $2a_2$ of the vapor producing chamber 2 as the modifying agent 21 (S91), and the interior of the vapor producing chamber 2 is heated by the heating device 7 to raise a temperature of the inner wall section $2a_2$ to 420K (S92), whereby a saturated vapor of nitric acid is produced in the space 2b. Also, the mixing section 9 is cooled to drop a temperature of the treatment space 9b in the mixing section 9 to 290K (S93).

Then, carbon black particles having a geometric mean particle size of 0.1 μm and the concentration of particles of $10^{12}/M^3$ are introduced into the space 2b in the vapor producing chamber 2 through the particle inlet 20 (S94). Consequently, the carbon black particles introduced into the space 2b are transported across the space 2b together with the saturated vapor of nitric acid filling the space 2b. Then, a mixed gas of the saturated vapor of nitric acid and carbon black particles is obtained in the mixing section 9, which is cooled therein by the cooling device 52. Consequently, the modified particles coated with a film of nitric acid are obtained. Then, the treated carbon black particles are introduced to the outside of the particle modifying apparatus 51, whereupon the treatment ends (S95).

The treated carbon black particles and non-treated carbon black particles are placed separately into super-pure water with stirring, and the wettability of each is checked. Then, the non-treated particles do not wet with the super-pure water and remain afloat on the surface. By contrast, the treated particles wet with the super-pure water and are dispersed/suspended therein. This reveals that the carbon black particles as a pigment modified by the present particle modifying method can attain better wettability.

As has been explained, according to the present particle modifying method, the particle modifying treatment is effected in the following steps of:

(1) producing the saturated vapor of the modifying agent 21 in the space 2b in the vapor producing chamber 2;

(2) introducing the particles 22 into the space 2b in the vapor producing chamber 2 through the particle inlet 20, and then sending the particles 22 to the mixing section 9 together with the saturated vapor of the modifying agent 21 to be mixed with each other and cooled therein by the cooling device 52; and (3) releasing the resulting modified particles from the mixing section 9.

Thus, the particle modifying treatment can be carried out repetitively in succession by successively introducing the particles 22 to the treatment space 9b through the particle inlet 20.

Embodiment 4

Referring to the accompanying drawings, the following description will describe still another example embodiment of the present invention. Hereinafter, like components are labeled with like reference numerals with respect to Embodiments 1, 2 and 3, and the description of these components is not repeated for the explanation's convenience.

Figure 17:
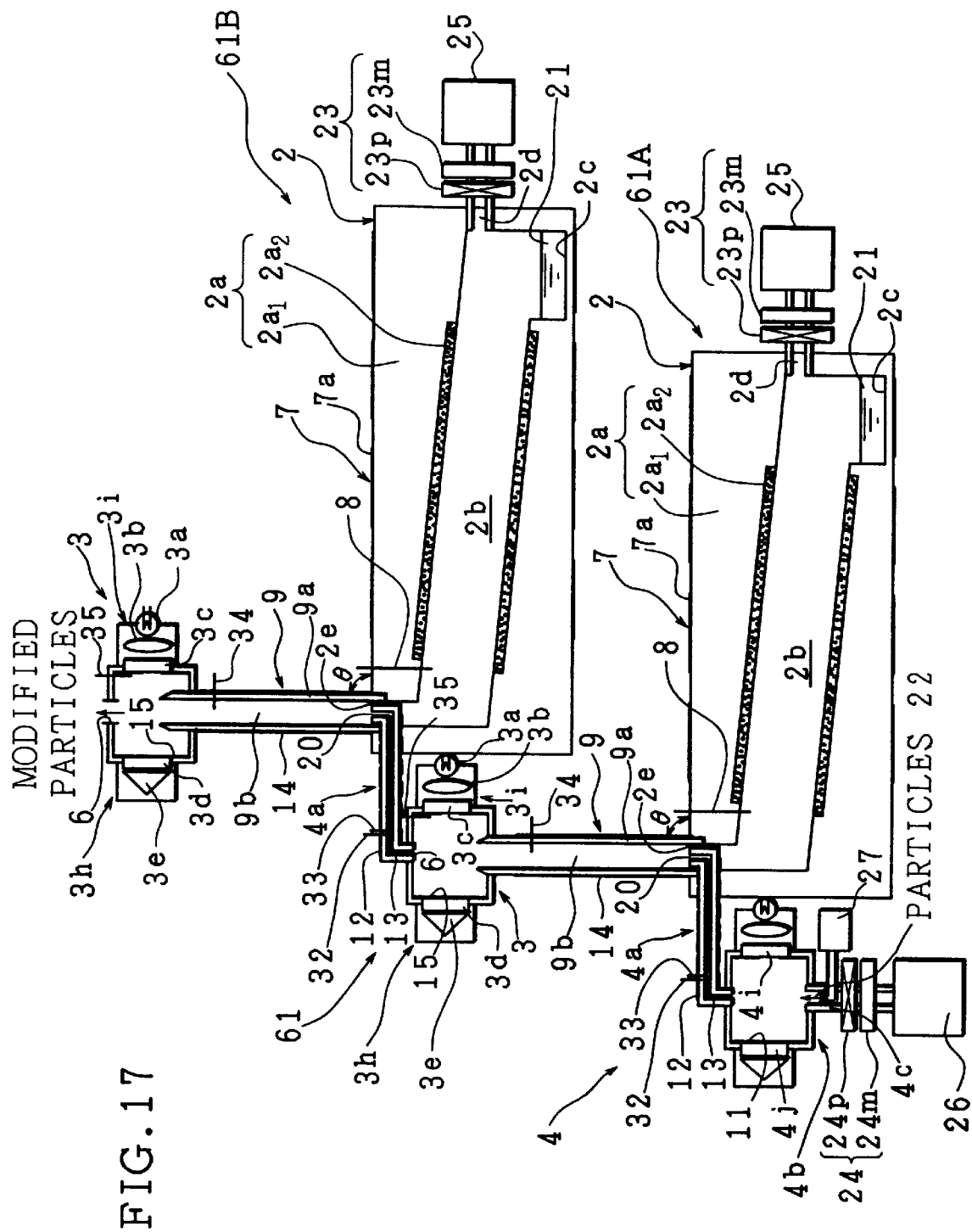
FIG. 17 is a vertical cross section showing a particle modifying apparatus in accordance with still another example embodiment of the present invention.

As shown in FIG. 17, a particle modifying apparatus 61 used for implementing the particle modifying method of the present embodiment is arranged to effect the modifying treatment repetitively to the same particles 22 using one kind or more than one kind of modifying agent 21 by particle modifying apparatuses 61A and 61B.

The particle modifying apparatus 61A is identical with the particle modifying apparatus 51, and the particle modifying apparatus 61B is identical with the particle modifying apparatus 51 except that the optical detecting device 4b and connecting pipe 4c are omitted.

As shown in FIG. 17, the particle modifying apparatus 61 is arranged in such a manner that the particle outlet 6 of the particle modifying apparatus 61 in the first stage is connected to the particle supplying pipe 4a of the particle modifying apparatus 61B in the second stage. Thus, the particle modifying apparatus 61 can effect the modifying treatment twice in succession. When the modifying treatment should be effected more than twice, as many particle modifying apparatus 51 as necessary are connected in series.

As previously mentioned, the higher a degree of the supersaturation of the modifying agent 21, the thicker a film of the modifying agent 21 coating the particles 22. Thus, when the modified particles of a large size are desired, it is preferable to use the modifying agent 21 which can attain a high degree of supersaturation. However, some kinds of the modifying agent 21 can not attain a sufficiently high degree of supersaturation to form a film of a desired thickness in a single treatment.

Also, if a degree of the supersaturation of the modifying agent 21 is too high, the modifying agent 21 may undergo the self-condensation to form particles besides the condensation using the particles 22 as the nuclei.

Thus, according to the particle modifying method of the present embodiment, as shown in FIG. 9, the treatment of forming the film of the modifying agent 21 on the surface of the particles 22 is effected repetitively to the same particles 22, so that a film of the modifying agent 21 of a desired thickness can be formed on the surface of the particles 22 even when the modifying agent 21 has a low degree of supersaturation, or as shown in FIG. 10, the treatment of forming the film of the modifying agent 21 on the surface of the particles 22 is effected repetitively to the same particles 22 using different kinds of the modifying agents 21, so that the modified particles having a desired particle size and coated with films of different kinds of modifying agents 21a and 21b are obtained. Since FIGS. 9 and 10 are explained in detail in Embodiment 1 above, the explanation of which is not repeated herein.

EXAMPLE 9

Figure 18:
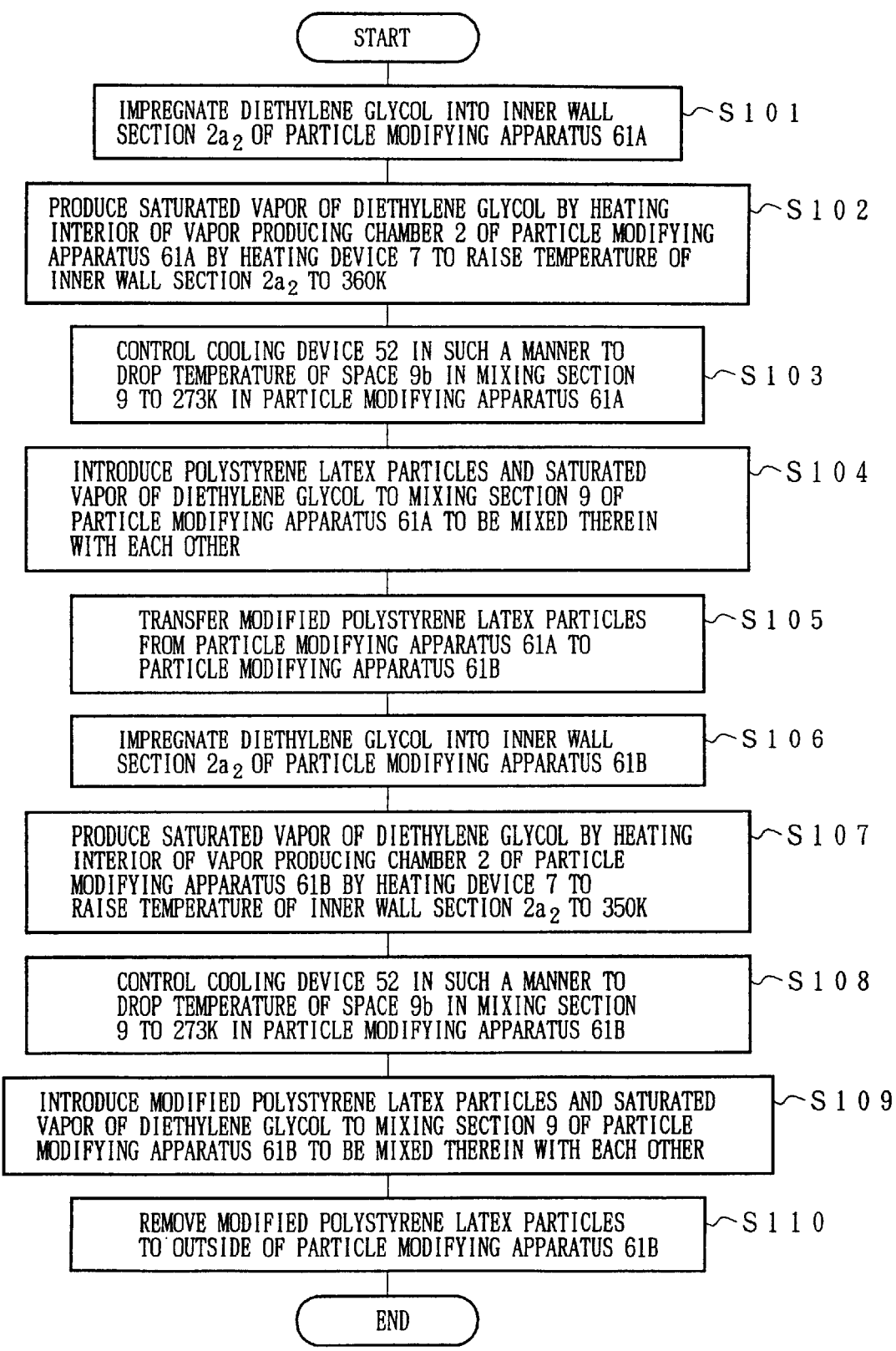
FIG. 18 is a flowchart detailing an example of the particle modifying method implemented by the particle modifying apparatus of FIG. 17.

Next, an example for effecting the modifying treatment using the same kind of modifying agent 21 twice in succession by the particle modifying apparatus 61 will be explained with reference to the flowchart of FIG. 18. To begin with, in the particle modifying apparatus 61A, diethylene glycol is impregnated into the inner wall section $2a_2$ of the vapor producing chamber 2 as the modifying agent 21 (S101), and the interior of the vapor producing chamber 2 is heated by the heating device 7 to raise a temperature of the inner wall section $2a_2$ to 360K (S102), whereby a saturated vapor of diethylene glycol is produced in the space 2b. Also, the mixing section 9 is cooled to drop a temperature of the treatment space 9b in the mixing section 9 to 273K (S103).

Then, polystyrene latex particles having an average particle size of 0.3 μm and the concentration of particles of $10^{10}/m^3$ are introduced into the vapor producing chamber 2 through the particle introducing section 4. Consequently, the polystyrene latex particles introduced into the space 2b are transported across the space 2b together with the saturated vapor of diethylene glycol filling the space 2b. Then, a mixed gas of the saturated vapor of diethylene glycol and polystyrene latex particles is obtained in the mixing section 9 cooled by the cooling device 52 (S104), whereupon diethylene glycol is turned into a supersaturated state. Consequently, diethylene glycol condenses on the surface of the polystyrene latex particles, and the surface of the polystyrene latex particles is coated with a film of diethylene glycol.

Thus, obtained as the final products by the above steps are the modified particles having the polystyrene latex particles as nuclei coated with a film of diethylene glycol and having a substantially uniform particle size with a primary average particle size of 2 μm.

Then, the treated polystyrene latex particles are introduced to the particle modifying apparatus 61B from the particle modifying apparatus 61A, and introduced into the space 2b through the particle introducing pipe 4a (S105)

Then, S106–S109 are carried out by the particle modifying apparatus 61B in the second stage in the same manner as S101–S104. Consequently, obtained as the final products are the modified particles having the polystyrene latex particles as the nuclei and coated with diethylene glycol as well as having a substantially uniform particle size with a primary average particle size of 3 μm. The modified particles thus obtained are released through the particle outlet 6 of the particle modifying apparatus 61B, whereupon the treatment ends

EXAMPLE 16

Figure 19:
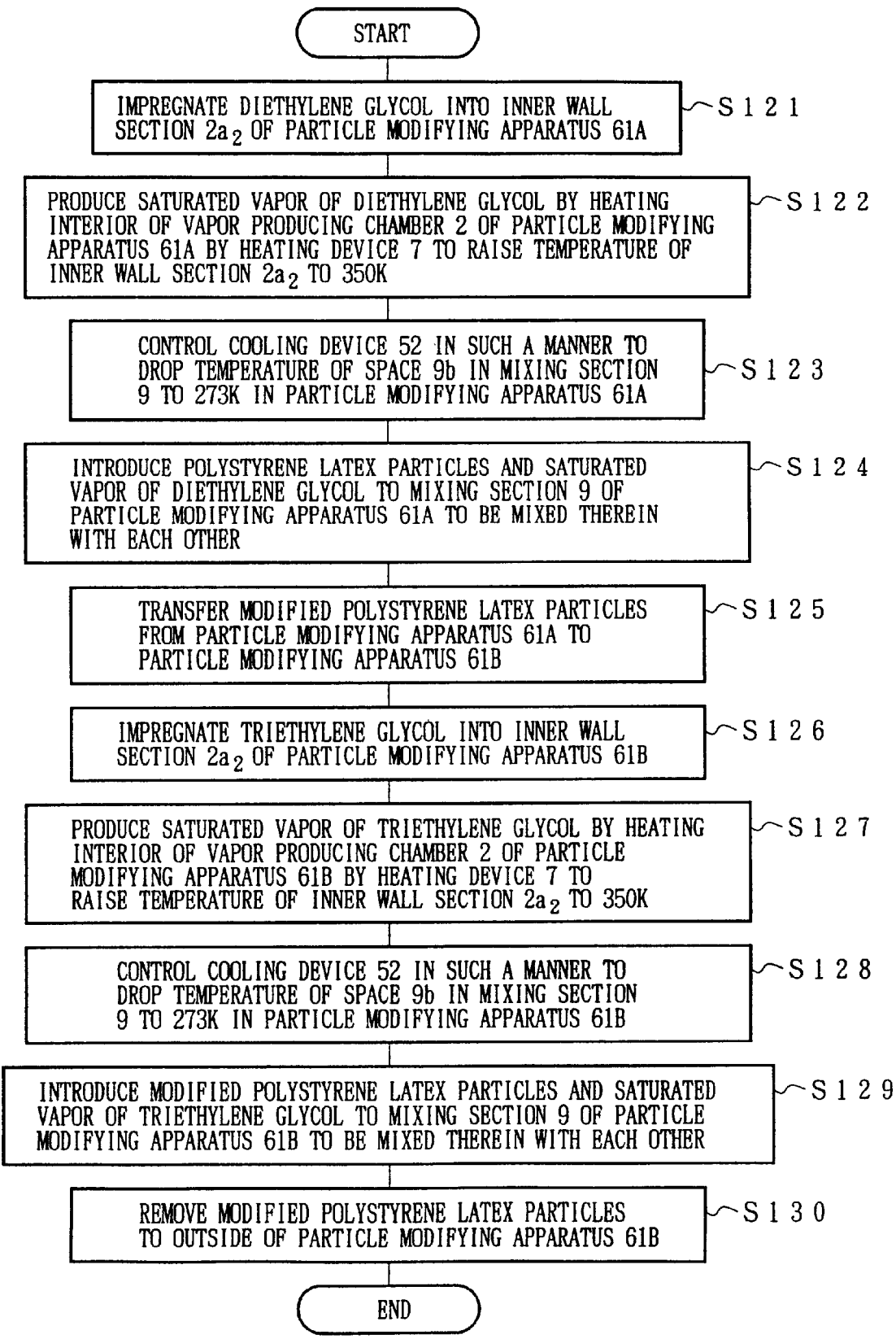
FIG. 19 is a flowchart detailing another example of the particle modifying method implemented by the particle modifying apparatus of FIG. 17.

Next, another example of effecting the modifying treatment twice in succession using different kinds of modifying agents 21 and the particle modifying apparatus 61 will be explained with reference to the flowchart of FIG. 19.

To begin with, in the particle modifying apparatus 61A in the first stage, diethylene glycol is impregnated into the inner wall section $2a_2$ of the vapor producing chamber 2 as the modifying agent 21 (S121), and the interior of the vapor producing chamber 2 is heated by the heating device 7 to raise a temperature of the inner wall section $2a_2$ to 350K (S122), whereby a saturated vapor of diethylene glycol is produced in the space 2b. Also, the mixing section 9 is cooled to drop a temperature of the treatment space 9b to 273K (S123).

Then, polystyrene latex particles having an average particle size of 0.3 μm and the concentration of particles Of $10^{10}/m^3$ are introduced into the space 2b in the vapor producing chamber 2 through the particle inlet 20. Consequently, the polystyrene latex particles introduced into the space 2b are transported across the space 2b together with the saturated vapor of diethylene glycol filling the space 2b. Then, a mixed gas of the saturated vapor of diethylene glycol and polystyrene latex particles is obtained in the mixing section 9 cooled by the cooling device 52 (S124). Then, diethylene glycol is turned into a supersaturated state, and immediately starts to condense on the surface of the polystyrene latex particles, and as a consequence, the surface of the polystyrene latex particles is coated with a film of diethylene glycol.

Thus, obtained as the final products by the above steps are the modified particles having the polystyrene latex particles as the nuclei and coated with the diethylene glycol as well as having a substantially uniform particle size with a primary average particle size of 2 μm.

Then, the treated polystyrene latex particles are sent to the particle modifying apparatus 61B from the particle modifying apparatus 61A, and introduced into the space 2b through the particle introducing pipe 4a (S125). In the particle modifying apparatus 61B in the second stage, S126–S129 are carried out in the same manner as S121–S124 except that triethylene glycol is used as the modifying agent 21.

Consequently, obtained as the final products are the modified particles having the polystyrene latex particles as the nuclei and coated with a film of diethylene glycol first and thence a film of triethylene glycol, as well as having a substantially uniform particle size with an average of 4 µm. The modified particles thus obtained are released from the particle outlet 6 of the particle modifying apparatus 61B, whereupon the treatment ends (S130).

In this manner, when more than one kind of modifying agent 21 is used, as many particle modifying apparatus 1 as the kinds of the modifying agents 21 are connected in series. Alternatively, a plurality kinds of modifying agents 21 may be impregnated in a single particle modifying apparatus 1, so that a film of a mixed modifying agents 21 is formed on the surface of the particles 22 by effecting the modifying treatment only once.

As has been explained, a particle modifying method of the present invention is a particle modifying method for forming a film of a modifying agent on the surface of the particles by exposing the particles to be modified to a supersaturated vapor of the modifying agent for modifying the particles to let the modifying agent condense on the surface of the particles, in which the supersaturated vapor of the modifying agent is formed around the particles by mixing the cooled particles with a vapor of the modifying agent.

According to the above method, not only a uniform film can be formed on the surface of the particles, but also the modified particles of a large particle size can be obtained. Moreover, the modifying agent can be vapor-deposited on the surface of the particles efficiently. Also, in case that particles of a liquid are used, the evaporation of the particles per se when the particles are introduced into the saturated vapor of the modifying agent can be suppressed.

In the above particle modifying method, it is preferable to thicken the film of the modifying agent formed on the surface of the particles by repeating a step of forming film of the modifying agent on the surface of the particles more than once.

According to the above method, even when a modifying agent having a low degree of supersaturation is used, the modified particles of a desired particle size can be obtained by repeating the modifying treatment as many times as needed.

In the above particle modifying method, it is preferably to use different kinds of the modifying agents separately in the film forming step repeated at least twice.

According to the above method, since the modifying agents of different kinds are used, the modifying agent of each kind can have different functions, thereby making it possible obtain the high-performance modified particles having more than one function. Moreover, the high-performance modified particles having thereon layered the modifying agents of different kinds can be obtained by repetitively effecting the modifying treatment to the same particles using different kinds of the modifying agents.

In the above particle modifying method, it is preferable to produce a saturated vapor of the modifying agent by heating the modifying agent.

According to the above method, since the saturated vapor of the modifying agent is produced by heating the modifying agent, a difference in temperature between the vapor of the modifying agent and the particles become larger, and the vapor of the modifying agent can be readily turned into a supersaturation state. Consequently, a larger amount of the modifying agent condenses on each particle when the vapor of the modifying agent and the particles are mixed, thereby making it possible to obtain the particles of a larger particle size.

As has been explained, a particle modifying apparatus of the present invention comprises:

a mixing section for mixing cooled particles with a vapor of a modifying agent for modifying the particles to let the modifying agent condense on a surface of the particles;

a particle introducing section for introducing the particles into said mixing section;

particle cooling means for cooling the particles in said particle introducing section; and a modifying agent vapor supplying section for supplying the vapor of the modifying agent to said mixing section.

According to the above arrangement, not only a uniform film can be formed on the surface of the particles, but also the modified particles of a large particle size can be obtained. Moreover, the modifying agent can be vapor-deposited on the surface of the particles efficiently. Also, in case that particles of a liquid are used, the evaporation of the particles per se when the particles are introduced into the saturated vapor of the modifying agent can be suppressed.

In the above particle modifying apparatus, it is preferable that said modifying agent vapor supplying section includes:

a vapor producing chamber capable of withholding the modifying agent inside thereof; and heating means for heating the modifying agent withheld in said vapor producing chamber to produce a saturated vapor of the modifying agent.

According to the above arrangement, since the saturated vapor of the modifying agent is produced by heating the modifying agent, a difference in temperature between the vapor of the modifying agent and the particles become larger, and the vapor of the modifying agent can be readily turned into a supersaturation state. Consequently, a larger amount of the modifying agent condenses on each particle when the vapor of the modifying agent and the particles are mixed, thereby making it possible to obtain the particles of a larger particle size.

It is more preferable that the above particle modifying apparatus further comprises temperature adjusting means for adjusting a temperature of said mixing section to stay above a temperature of the vapor of the modifying agent after the modifying agent is mixed with the particles.

According to the above arrangement, the condensation of the vapor of the modifying agent on the inner surface of the mixing section can be prevented. Consequently, the modifying agent can undergo the condensation phenomenon efficiently, so that not only a loss of the modifying agent can be reduced, but also the modified particles of substantially the same particle size can be obtained.

It is preferable that the above particle modifying apparatus further comprises temperature adjusting means for adjusting a temperature of said mixing section to stay below a temperature of the vapor of the modifying agent after the modifying agent is mixed with the particles.

According to the above arrangement, a larger amount of the modifying agent condenses on each particle and the particles of a larger particle size can be obtained by further cooling a mixture of the particles and saturated atmosphere of the vapor.

It is preferable that the above particle modifying apparatus further comprises a modifying agent transport gas supplying device for supplying a modifying agent transport gas, which transports the vapor of the modifying agent to said mixing section, to said modifying agent vapor supplying section, said modifying agent transport gas supplying device being connected to said modifying agent vapor supplying section through a first impurity removing device for removing impurities contained in said modifying agent transport gas.

According to the above arrangement, even when less pure commercially available gas or air is used as the modifying agent transport gas, the condensation of the modifying agent using the floating impure fine particles as the nuclei can be prevented, while at the same time the condensation of an impure vapor contained in the particle transport gas can be prevented.

It is preferable that the above particle modifying apparatus further comprises a particle transport gas supplying device for supplying a particle transport gas, which transports the particles to said mixing section, to said particle introducing section, said particle transport gas supplying device being connected to said particle introducing section through a second impurity removing device for removing impurities contained in said particle transport gas.

According to the above arrangement, even when less pure commercially available gas or air is used as the modifying agent transport gas, not only condensation of the modifying agent using the floating impure fine particles as the nuclei, but also the condensation of an impure vapor contained in the particle transport gas can be prevented.

In the above particle modifying apparatus, it is preferable that:

said particle introducing section includes a particle introducing pipe, connected to an end portion of said modifying agent vapor supplying section at a side connected to said mixing, section, for supplying the particles to said end portion; and said particle cooling means cools an inner surface of said particle introducing pipe.

The above arrangement makes it possible to prevent the deterioration (including liquidation or evaporation), deformation, transformation, etc. of the particles caused by the heat during the transportation step through the particle introducing pipe before they are mixed with the saturated vapor of the modifying agent in the mixing section.

In the above particle modifying apparatus, it is preferable that:

said particle introducing section includes a particle introducing pipe, connected to an end portion of said modifying agent vapor supplying section at a side connected to said mixing section, for supplying the particles to said end portion; and outer surface heating means, provided on an outer surface of said particle introducing section, for heating the outer surface of said particle introducing pipe above a temperature of said modifying agent vapor supplying section.

According to the above arrangement, since the outer surface of the particle introducing pipe can be heated to a temperature above a temperature of the modifying agent vapor supplying device, the modifying agent, which is turned into a vapor in the vapor producing chamber, is not cooled by the outer surface of the particle introducing pipe, and therefore does not condense thereon.

In the above particle modifying apparatus, it is preferable that:

said particle introducing section includes a particle introducing pipe, connected to an end portion of said modifying agent vapor supplying section at a side connected to said mixing section, for supplying the particles to said end portion; and said particle introducing pipe includes an inner wall section, an outer wall section, and a heat insulator layer interposed between said inner wall section and outer wall section.

The above arrangement makes it possible to prevent not only the heating of a space in the particle introducing pipe by the saturated vapor of the modifying agent, but also the condensation of the saturated vapor of the modifying agent on the outer wall section. Further, the temperatures of the outer wall section and inner wall section can be adjusted accurately in a short time by the above arrangement.

As has been explained, another particle modifying apparatus of the present invention comprises:

a mixing section for mixing particles with a vapor of a modifying agent for modifying the particles;

a vapor producing chamber for producing the vapor of the modifying agent inside thereof;

a vapor outlet, provided at an end portion of said vapor producing chamber, for introducing the vapor of the modifying agent to said mixing section;

a particle inlet, provided to said vapor producing chamber at an end portion at a side of said vapor outlet, for introducing the particles into said vapor producing chamber; and cooling means for cooling a mixture of the particles and the vapor of the modifying agent in said mixing section to let the modifying agent condense on a surface of the particles.

According to the above arrangement, since the particle inlet is provided at the end portion of the vapor producing chamber at a side of the vapor outlet, the deterioration of the particles by the heat in the vapor producing chamber can be prevented. At the same time, a drop in concentration of the vapor of the modifying agent as it adheres to the particle introducing section can be prevented. Further, there can be offered another effect that heat is not transferred from the vapor producing chamber to the particle introducing section.

It is preferable that the above particle modifying apparatus further comprises heating means for heating the modifying agent in said vapor producing chamber to produce a saturated vapor of the modifying agent.

According to the above arrangement, since the saturated vapor of the modifying agent is produced by heating the modifying agent, a difference in temperature between the vapor of the modifying agent and the particles become larger, and the vapor of the modifying agent can be readily turned into a supersaturation state. Consequently, a larger amount of the modifying agent condenses on each particle when the vapor of the modifying agent and the particles are mixed, thereby making it possible to obtain the particles of a larger particle size.

It is preferable that the above particle modifying apparatus further comprises:

a particle introducing pipe connected to said particle inlet to send the particles through said particle inlet; and outer surface heating means for heating an outer surface of said particle introducing pipe to a temperature above a temperature of said modifying agent vapor supplying section.

According to the above arrangement, since the outer surface of the particle introducing pipe can be heated to a temperature above a temperature of the modifying agent vapor supplying device, the condensation of the modifying agent which is turned into a vapor in the vapor producing chamber by being cooled by the outer surface of the particle introducing pipe can be prevented.

It is preferable that the above particle modifying apparatus further comprises a particle introducing pipe connected to said particle inlet to send the particles through said particle inlet, wherein, said particle introducing pipe includes an inner wall section, an outer wall section, and a heat insulator layer interposed. between said inner wall section and outer wall section.

The above arrangement makes it possible to prevent not only the heating of a space in the particle introducing pipe by the saturated vapor of the modifying agent, but also the condensation of the saturated vapor of the modifying agent on the outer wall section. Further, the temperatures of the outer wall section and inner wall section can be adjusted accurately in a short time by the above arrangement.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A particle modifying apparatus comprising:

a mixing section for mixing cooled particles with a saturated vapor of a modifying agent for modifying the particles to let the modifying agent condense on a surface of the particles;

a particle introducing section for introducing the particles into said mixing section;

particle cooling means for cooling the particles in said particle introducing section so as to be capable of producing a supersaturated atmosphere of the modifying agent surrounding the particles when the particles are mixed with the saturated vapor of the modifying agent; and a modifying agent vapor supplying section for turning the modifying agent into the saturated vapor prior to supplying the saturated vapor of the modifying agent to said mixing section, whereby the particle introducing section and the modifying agent vapor supplying section introduce the cooled particles and the saturated vapor of the modifying agent separately into the mixing section.

2. The particle modifying apparatus of claim 1, wherein said modifying agent vapor supplying section includes:

a vapor producing chamber capable of withholding the modifying agent inside; and heating means for heating the modifying agent withheld in said vapor producing chamber to produce a saturated vapor of the modifying agent.

3. The particle modifying apparatus of claim 2, wherein at least a part of an inner wall of said vapor producing chamber is made of a porous material which can impregnate the modifying agent.

4. The particle modifying apparatus of claim 1, wherein said mixing section is provided in such a manner to tilt at an angle between 80 and 100 degrees with respect to a horizontal direction.

5. The particle modifying apparatus of claim 1, further comprising temperature adjusting means for adjusting a temperature of said mixing section to stay above a temperature of the vapor of the modifying agent after the modifying agent is mixed with the particles.

6. The particle modifying apparatus of claim 1, further comprising temperature adjusting means for adjusting a temperature of said mixing section to stay below a temperature of the vapor of the modifying agent after the modifying agent is mixed with the particles.

7. The particle modifying apparatus of claim 1, further comprising optical detecting means for detecting at least one of a particle size and concentration of particles of the particles in said mixing section.

8. The particle modifying apparatus of claim 1, further comprising a modifying agent transport gas supplying device for supplying a modifying agent transport gas, which transports the vapor of the modifying agent to said mixing section, to said modifying agent vapor supplying section, said modifying agent transport gas supplying device being connected to said modifying agent vapor supplying section through a first impurity removing device for removing impurities contained in said modifying agent transport gas.

9. The particle modifying apparatus of claim 1, further comprising a particle transport gas supplying device for supplying a particle transport gas, which transports the particles to said mixing section, to said particle introducing section, said particle transport gas supplying device being connected to said particle introducing section through a second impurity removing device for removing impurities contained in said particle transport gas.

10. The particle modifying apparatus of claim 1, wherein:

said particle introducing section includes a particle introducing pipe, connected to an end portion of said modifying agent vapor supplying section at a side connected to said mixing section, for supplying the particles to said end portion; and said particle cooling means cools an inner surface of said particle introducing pipe.

11. The particle modifying apparatus of claim 1, wherein:

said particle introducing section includes a particle introducing pipe, connected to an end portion of said modifying agent vapor supplying section at a side connected to said mixing section, for supplying the particles to said end portion; and outer surface heating means, provided on an outer surface of said particle introducing section, for heating the outer surface of said particle introducing pipe above a temperature of said modifying agent vapor supplying section.

12. The particle modifying apparatus of claim 1, wherein:

said particle introducing section includes a particle introducing pipe, connected to an end portion of said modifying agent vapor supplying section at a side connected to said mixing section, for supplying the particles to said end portion; and said particle introducing pipe includes an inner wall section, an outer wall section, and a heat insulator layer interposed between said inner wall section and outer wall section.

13. The particle modifying apparatus of claim 1, wherein said particle introducing section includes:

a particle introducing pipe, connected to an end portion of said modifying agent vapor supplying section at a side connected to said mixing section, for supplying the particles to said end portion; and optical detecting means for detecting one of a particle size and concentration of particles of the particles in said particle introducing pipe.

14. A particle modifying apparatus comprising:

a mixing section for mixing particles with a saturated vapor of a modifying agent for modifying the particles wherein the modifying agent has been turned into the saturated vapor prior to supplying the saturated vapor of the modifying agent to the mixing section;

a vapor producing chamber for producing the saturated vapor of the modifying agent inside thereof;

a vapor outlet, provided at an end portion of said vapor producing chamber, for introducing the saturated vapor of the modifying agent from said vapor producing chamber into said mixing section;

a particle inlet, provided at the end portion of said vapor producing chamber where said vapor outlet end portion is provided, for introducing the particles into said mixing section; and cooling means for cooling a mixture of the particles and the saturated vapor of the modifying agent in said mixing section to let the modifying agent condense on a surface of the particles.

15. The particle modifying apparatus of claim 14, further comprising optical detecting means for detecting at least one of a particle size and concentration of particles of the particles in said mixing section.

16. The particle modifying apparatus of claim 14, further comprising heating means for heating the modifying agent in said vapor producing chamber to produce a saturated vapor of the modifying agent.

17. The particle modifying apparatus of claim 14, further comprising:

a particle introducing pipe connected to said particle inlet to send the particles through said particle inlet; and outer surface heating means for heating an outer surface of said particle introducing pipe to a temperature above a temperature of said modifying agent vapor supplying section.

18. The particle modifying apparatus of claim 14, further comprising a particle introducing pipe connected to said particle inlet to send the particles through said particle inlet, wherein, said particle introducing pipe includes an inner wall section, an outer wall section, and a heat insulator layer interposed between said inner wall section and outer wall section.

19. The particle modifying apparatus of claim 14, further comprising:

a particle introducing pipe connected to said particle inlet to send the particles through said particle inlet; and optical detecting means for detecting at least one of a particle size and concentration of particles of the particles in said particle introducing pipe.

* * * * *